(12) United States Patent
Aio et al.

(10) Patent No.: US 11,218,973 B2
(45) Date of Patent: Jan. 4, 2022

(54) TRANSMISSION APPARATUS AND TRANSMISSION METHOD, RECEPTION APPARATUS AND RECEPTION METHOD, AND COMMUNICATION SYSTEM

(71) Applicant: Sony Corporation, Tokyo (JP)

(72) Inventors: Kosuke Aio, Kanagawa (JP); Yusuke Tanaka, Tokyo (JP); Ryuichi Hirata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/964,600

(22) PCT Filed: Jan. 18, 2019

(86) PCT No.: PCT/JP2019/001381
§ 371 (c)(1),
(2) Date: Jul. 24, 2020

(87) PCT Pub. No.: WO2019/150982
PCT Pub. Date: Aug. 8, 2019

(65) Prior Publication Data
US 2021/0058869 A1    Feb. 25, 2021

(30) Foreign Application Priority Data
Jan. 31, 2018    (JP) .............................. JP2018-015401

(51) Int. Cl.
*H04W 52/24*    (2009.01)
*H04W 52/14*    (2009.01)
(Continued)

(52) U.S. Cl.
CPC ......... *H04W 52/143* (2013.01); *H04L 5/0048* (2013.01); *H04W 52/24* (2013.01); *H04W 76/19* (2018.02); *H04W 84/12* (2013.01)

(58) Field of Classification Search
CPC ... H04W 52/143; H04W 52/24; H04W 76/19; H04W 64/12; H04L 5/0048
(Continued)

(56) References Cited

U.S. PATENT DOCUMENTS 6,124,898 A * 9/2000 Patel ..................... H04L 1/0065
348/607
6,330,459 B1 * 12/2001 Crichton ............... H04W 16/28
455/434
(Continued)

FOREIGN PATENT DOCUMENTS

JP    2015-050674 A    3/2015
JP    2016-504804 A    2/2016
(Continued)

OTHER PUBLICATIONS

International Search Report and Written Opinion dated Mar. 5, 2019 for PCT/JP2019/001381 filed on Jan. 18, 2019, 9 pages including English Translation of the International Search Report.

*Primary Examiner* — Hai V Nguyen
(74) *Attorney, Agent, or Firm* — Xsensus LLP

(57) ABSTRACT

The present disclosure relates to a transmission apparatus and a transmission method, a reception apparatus and a reception method, and a communication system that make it possible to implement stabilized communication irrespective of a fluctuation of a communication environment in a WLAN (Wireless LAN, WaveLAN).
When a transmission apparatus transmits a data signal to a reception apparatus, the reception apparatus returns a response signal including a feedback parameter (FP) to the transmission apparatus. In a case where a reception situation of the reception apparatus is poor and improvement of it is necessitated on the basis of the FP, the transmission apparatus adjusts transmission power or the like to improve the
(Continued)

reception situation of the reception apparatus. The present disclosure can be applied to a communication system in a WLAN.

20 Claims, 16 Drawing Sheets

(51) Int. Cl.
  *H04W 76/19*     (2018.01)
  *H04L 5/00*      (2006.01)
  *H04W 84/12*     (2009.01)
(58) Field of Classification Search
  USPC .................................................. 455/522, 69
  See application file for complete search history.

(56)            References Cited

U.S. PATENT DOCUMENTS

| | | | | |
|---|---|---|---|---|
| 6,445,692 | B1* | 9/2002 | Tsatsanis | H04B 1/7097 370/320 |
| 6,880,103 | B2* | 4/2005 | Kim | H04L 1/1887 714/18 |
| 7,239,650 | B2* | 7/2007 | Rakib | H03M 13/256 348/E7.07 |
| 7,366,244 | B2* | 4/2008 | Gebara | H01Q 1/521 375/259 |
| 7,885,604 | B2* | 2/2011 | Wee | H04B 1/7103 455/63.1 |
| 8,121,079 | B2* | 2/2012 | Geng | H04B 7/022 370/329 |
| 8,179,856 | B2* | 5/2012 | Kamata | H04W 28/06 370/330 |
| 8,489,028 | B2* | 7/2013 | Bhattad | H04W 72/0413 455/63.1 |
| 8,526,966 | B2* | 9/2013 | Chen | H04W 72/1205 455/454 |
| 8,554,147 | B2* | 10/2013 | Bhattad | H04L 5/0073 455/63.1 |
| 9,326,253 | B2* | 4/2016 | Bhushan | H04W 52/325 |
| 9,392,524 | B2* | 7/2016 | Grandhi | H04W 28/18 |
| 9,668,265 | B2* | 5/2017 | Palanki | H04L 1/0036 |
| 9,854,498 | B2* | 12/2017 | Grandhi | H04W 28/18 |
| 9,949,277 | B1* | 4/2018 | Anand | H04J 11/0023 |
| 10,014,904 | B1* | 7/2018 | Anand | H04L 1/0009 |
| 10,104,624 | B2* | 10/2018 | Sundararajan | H04W 52/143 |
| 10,306,476 | B2* | 5/2019 | Li | H04W 16/02 |
| 10,420,021 | B2* | 9/2019 | Kim | H04W 28/08 |
| 10,694,452 | B2* | 6/2020 | Patwardhan | H04W 16/18 |
| 10,790,930 | B2* | 9/2020 | Chen | H04L 1/0036 |
| 10,848,254 | B2* | 11/2020 | Patwardhan | H04W 48/16 |
| 10,897,781 | B2* | 1/2021 | Jung | H04L 5/0023 |
| 10,979,183 | B2* | 4/2021 | Wang | H04L 1/1635 |
| 2002/0056055 | A1* | 5/2002 | Kim | H04L 1/1887 714/18 |
| 2006/0240794 | A1* | 10/2006 | Cozzo | H04B 1/7107 455/295 |
| 2007/0219059 | A1* | 9/2007 | Schwartz | A61B 7/003 482/8 |
| 2008/0069058 | A1* | 3/2008 | Geng | H04W 52/42 370/336 |
| 2009/0130979 | A1* | 5/2009 | Bhushan | H04W 52/325 455/63.1 |
| 2009/0247181 | A1* | 10/2009 | Palanki | H04W 72/082 455/452.2 |
| 2009/0290550 | A1* | 11/2009 | Bhattad | H04L 5/0073 370/329 |
| 2009/0291640 | A1* | 11/2009 | Bhattad | H04W 72/0406 455/63.1 |
| 2010/0085987 | A1* | 4/2010 | Kamata | H04W 28/06 370/477 |
| 2012/0001730 | A1* | 1/2012 | Potyrailo | G06K 19/0717 340/10.1 |
| 2013/0170387 | A1* | 7/2013 | Wang | H04W 4/70 370/252 |
| 2014/0098681 | A1* | 4/2014 | Stager | H04W 24/02 370/252 |
| 2015/0271732 | A1* | 9/2015 | Grandhi | H04W 28/18 370/329 |
| 2015/0289147 | A1* | 10/2015 | Lou | H04B 7/0452 370/329 |
| 2016/0227489 | A1* | 8/2016 | Oteri | H04W 52/12 |
| 2016/0262054 | A1* | 9/2016 | Singh | H04W 74/0808 |
| 2016/0269971 | A1* | 9/2016 | Kim | H04W 4/80 |
| 2016/0323802 | A1* | 11/2016 | Grandhi | H04W 40/04 |
| 2016/0374092 | A1* | 12/2016 | Gao | H04W 72/0486 |
| 2017/0064583 | A1* | 3/2017 | Roy | H04W 36/0009 |
| 2017/0142017 | A1* | 5/2017 | Davis | H04W 28/0284 |
| 2017/0142753 | A1* | 5/2017 | Wang | H04W 16/14 |
| 2017/0170937 | A1 | 6/2017 | Chun et al. | |
| 2017/0311166 | A1* | 10/2017 | Li | H04W 16/02 |
| 2017/0374610 | A1* | 12/2017 | Kim | H04W 28/08 |
| 2018/0132189 | A1* | 5/2018 | Sundararajan | H04W 52/50 |
| 2018/0270038 | A1* | 9/2018 | Oteri | H04L 5/0037 |
| 2018/0302194 | A1* | 10/2018 | Wang | H04L 1/1664 |
| 2019/0058545 | A1* | 2/2019 | Chen | H04L 1/0036 |
| 2020/0213933 | A1* | 7/2020 | Patil | H04W 8/245 |
| 2020/0280975 | A1* | 9/2020 | Asterjadhi | H04W 28/18 |
| 2021/0007006 | A1* | 1/2021 | Chen | H04L 1/1812 |
| 2021/0014776 | A1* | 1/2021 | Patil | H04W 76/15 |
| 2021/0014911 | A1* | 1/2021 | Patil | H04W 4/23 |
| 2021/0058869 | A1* | 2/2021 | Aio | H04W 76/19 |
| 2021/0234642 | A1* | 7/2021 | Wang | H04L 1/1664 |
| 2021/0250205 | A1* | 8/2021 | Merlin | H04B 7/0626 |

FOREIGN PATENT DOCUMENTS

| | | |
|---|---|---|
| WO | WO-2004077685 A2 | 9/2004 |
| WO | 2016/112306 A1 | 7/2016 |

* cited by examiner

```
TRANSMISSION APPARATUS
START OF TRANSMISSION PROCESS
        ↓
TRANSMIT PREAMBLE — S111
        ↓
TRANSMIT SUB-FRAME OF Break Flag = 0 — S112
        ↓
RECEIVE RESPONSE SIGNAL INCLUDING FP — S113
        ↓
S114: DESTINED FOR BSS SAME AS THAT OF OWN APPARATUS?
   NO → S123: IS SUPPRESSION OF INTERFERING AMOUNT NECESSARY?
            NO → (loop back)
            YES → S124: GENERATE AND TRANSMIT SUB-FRAME OF Break Flag = 1
   YES ↓
S115: DESTINED FOR OWN APPARATUS?
   NO → S122: STOP TRANSMISSION OPERATION
   YES ↓
S116: IS RECEPTION ABORTION flag == 1?
   YES → S117: TRANSMIT SUB-FRAME OF Break Flag = 0
   NO ↓
S119: ABORT TRANSMISSION OF SUB-FRAME AFTER LAPSE OF REMAINING Length
        ↓
S120: RE-SET TRANSMISSION PARAMETER
        ↓
S121: TRANSMIT NEW PREAMBLE
        ↓
S118: END?
   NO → (loop)
   YES → END
```

TRANSMISSION APPARATUS AND TRANSMISSION METHOD, RECEPTION APPARATUS AND RECEPTION METHOD, AND COMMUNICATION SYSTEM

CROSS-REFERENCE TO RELATED APPLICATIONS

The present application is based on PCT filing PCT/JP2019/001381, filed Jan. 18, 2019, which claims priority to JP 2018-015401, filed Jan. 31, 2018, the entire contents of each are incorporated herein by reference.

TECHNICAL FIELD

The present disclosure relates to a transmission apparatus and a transmission method, a reception apparatus and a reception method, and a communication system, and particularly to a transmission apparatus and a transmission method, a reception apparatus and a reception method, and a communication system that make it possible to implement stabilized communication irrespective of a fluctuation of a communication environment in a WLAN (Wireless LAN, WaveLAN).

BACKGROUND ART

In the IEEE802.11 standard at present, a contrivance for packet transmission by an A-MPDU (Aggregation-MAC Protocol Data Unit) is utilized.

In the A-MPDU method, after synchronization and parameter acquisition necessary for reception are completed at a top portion (hereinafter referred to as preamble), a plurality of pieces of data (A-MPDU sub-frame: hereinafter referred to as sub-frame) is connected into and transmitted as one big data (frame) to implement a high efficiency of packet communication.

Further, by receiving a response signal (Block Ack) from the reception side after completion of transmission of the packet, it can be known whether or not a plurality of sub-frames has been received correctly.

However, it is considered that, as the time required for packet transmission one time by the A-MPDU method increases, the influence of the fluctuation of a communication environment is likely to increase and the mobility performance degrades.

For example, if at least one of a transmitter or a receiver moves during packet transmission, then the possibility increases that reception power may decrease, resulting in a failure to correctly receive a packet from the middle of the transmission. Further, also in the case where collision of a packet occurs from an influence of a hidden terminal or the like, the possibility occurs similarly that a packet cannot be received correctly from the middle of the transmission.

In such a case as described above, it is necessary to maintain a good reception performance irrespective of a fluctuation of a communication environment (reception environment) either by causing the transmitter to adjust a transmission parameter such as transmission power or by letting an interfering terminal, by which the collision is made, adjust a transmission parameter such as transmission power.

However, according to the standard at present, since reception environment information regarding the reception side can be known only if a response signal is acquired after one time packet transmission is completed, it is impossible to adjust the transmission parameter following the fluctuation of the reception environment.

Therefore, a method is proposed by which information regarding whether or not a data signal can be received correctly is received from the reception side to decide whether transmission is to be continued or interrupted (refer to PTL 1).

CITATION LIST

Patent Literature

[PTL 1]
   Japanese Patent Laid-Open No. 2015-050674

SUMMARY

Technical Problem

However, according to the decision method of the technology of PTL 1, since it uses simple transmission continuation decision, there is the possibility that communication may be disabled under such a crowded environment that packet collision occurs frequently.

The present disclosure has been made in view of such a situation as described above and particularly makes it possible to improve the mobility in a WLAN (Wireless LAN, WaveLAN) standardized by IEEE802.11 and implement stabilized communication irrespective a fluctuation of a communication environment.

Solution to Problem

A transmission apparatus according to a first aspect of the present disclosure is a transmission apparatus including a transmission section configured to transmit a data signal to a reception apparatus, a reception section configured to receive a response signal from the reception apparatus by which the data signal is received simultaneously when the data signal is transmitted, and a control section configured to adjust a transmission parameter for controlling the transmission of the transmission section on the basis of the response signal. The transmission section is controlled with the transmission parameter adjusted by the control section to transmit the data signal to the reception apparatus.

A transmission method according to the first aspect of the present disclosure is a transmission method including a transmission process of transmitting a data signal to a reception apparatus, a reception process of receiving a response signal from the reception apparatus by which the data signal is received simultaneously when the data signal is transmitted, and a control process of adjusting a transmission parameter for controlling the transmission of the transmission process on the basis of the response signal. The transmission process is controlled with the transmission parameter adjusted by the control process to transmit the data signal to the reception apparatus.

In the first aspect of the present disclosure, the data signal is transmitted to the reception apparatus, and the response signal from the reception apparatus by which the data signal is received is received simultaneously when the data signal is transmitted. Then, the transmission parameter for controlling the transmission is adjusted on the basis of the response signal and, under the control with the adjusted transmission parameter, the data signal is transmitted to the reception apparatus.

A reception apparatus according to a second aspect of the present disclosure is a reception apparatus including a reception section configured to receive a data signal transmitted from a transmission apparatus, and a transmission section configured to transmit a response signal to the reception of the data signal by the reception section simultaneously when the data signal is received. The reception section receives the data signal whose transmission is controlled with a transmission parameter adjusted on the basis of the response signal by the transmission apparatus.

A reception method according to the second aspect of the present disclosure is a reception method including a reception process of receiving a data signal transmitted from a transmission apparatus, and a transmission process of transmitting a response signal to the reception of the data signal by the reception process simultaneously when the data signal is received. The reception process receives the data signal whose transmission is controlled with a transmission parameter adjusted on the basis of the response signal by the transmission apparatus.

In the second aspect of the present disclosure, the data signal transmitted from the transmission apparatus is received, and the response signal to the reception of the data signal is transmitted simultaneously when the data signal is received. The data signal whose transmission is controlled with the transmission parameter adjusted on the basis of the response signal by the transmission apparatus is received.

A communication system according to a third aspect of the present disclosure is a communication system including a transmission apparatus and a reception apparatus. The transmission apparatus includes a first transmission section configured to transmit a data signal to the reception apparatus, a first reception section configured to receive a response signal from the reception apparatus by which the data signal is received simultaneously when the data signal is transmitted, and a control section configured to adjust a transmission parameter for controlling the transmission of the first transmission section on the basis of the response signal. The first transmission section is controlled with the transmission parameter adjusted by the control section to transmit the data signal to the reception apparatus. The reception apparatus includes a second reception section configured to receive a data signal transmitted from the transmission apparatus, and a second transmission section configured to transmit a response signal to the reception of the data signal by the second reception section simultaneously when the data signal is received. The second reception section receives the data signal whose transmission is controlled with a transmission parameter adjusted on the basis of the response signal by the transmission apparatus.

In the third aspect of the present disclosure, the communication system includes the transmission apparatus and the reception apparatus. In the transmission apparatus, a data signal is transmitted to the reception apparatus, and a response signal from the reception apparatus by which the data signal is received is received simultaneously when the data signal is transmitted. Then, the transmission parameter for controlling the transmission is adjusted on the basis of the response signal, and the data signal is transmitted to the reception apparatus under the control with the adjusted transmission parameter. Then, the transmitted data signal is received, and a response signal to the reception of the data signal is transmitted simultaneously when the data signal is received. Thus, the data signal whose transmission is controlled with the transmission parameter adjusted on the basis of the response signal by the transmission apparatus is received.

Advantageous Effect of Invention

With the one aspect of the present disclosure, stabilized communication can be implemented irrespective of a fluctuation of a communication environment especially in a WLAN (Wireless LAN, WaveLAN).

BRIEF DESCRIPTION OF DRAWINGS

FIG. 8 is a flow chart illustrating a transmission process by the transmission apparatus of FIG. 3.

FIG. 14 is a flow chart illustrating a transmission process by the transmission apparatus of FIG. 11.

DESCRIPTION OF EMBODIMENTS

Figure 1:
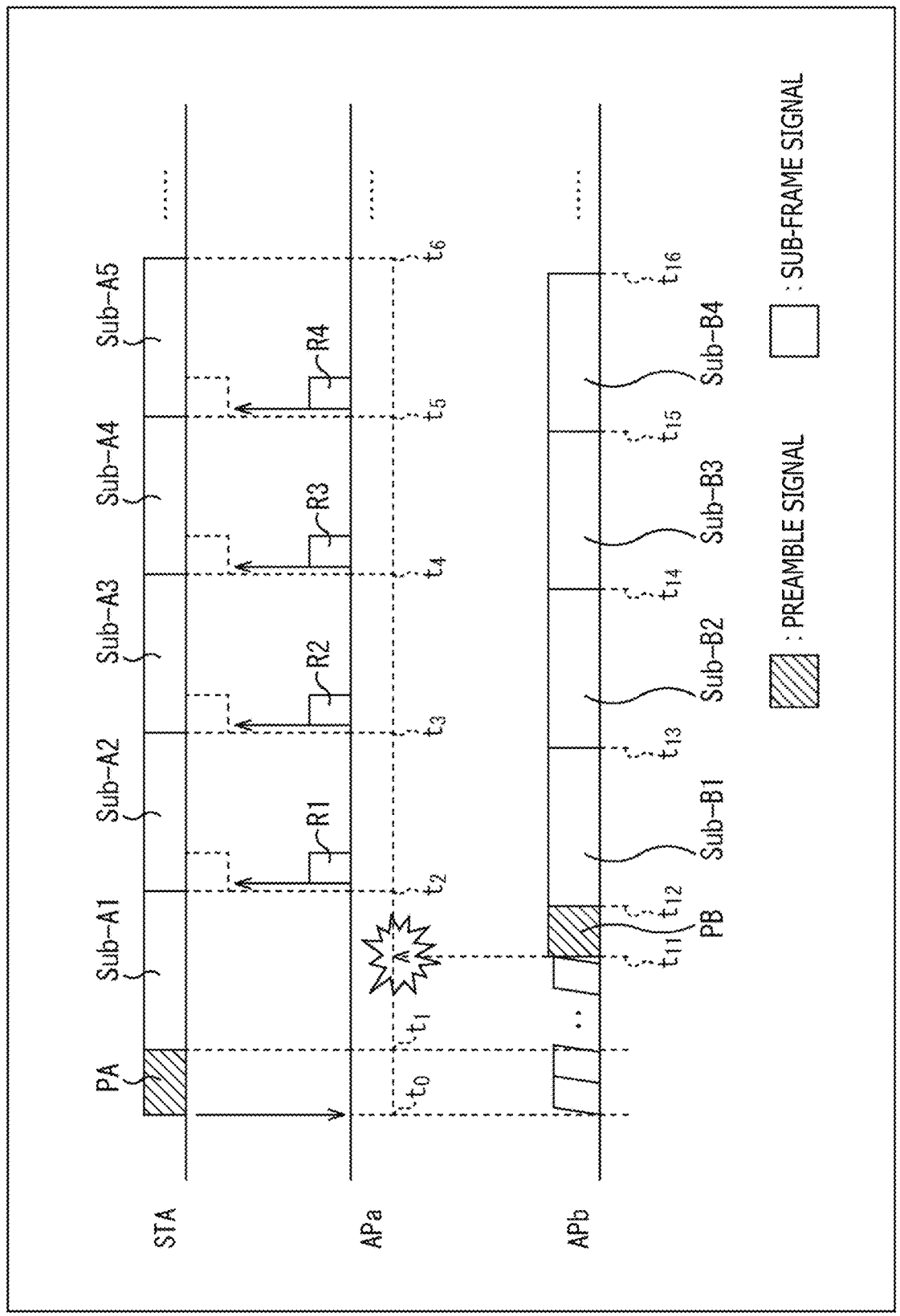
FIG. 1 is a view illustrating an overview of the present disclosure.

In the following, preferred embodiments of the present disclosure are described in detail with reference to the accompanying drawings. It is to be noted that components having substantially the same functional configurations in the specification and the drawings are denoted by the same reference signs and overlapping description them is omitted.

Modes for carrying out the present technology are described below. Description is given in accordance with the following order.

1. Overview of Present Disclosure
2. First Embodiment
3. Second Embodiment
4. Example executed by Software 1. Overview of Present Disclosure The present disclosure relates to a communication system that improves a mobility performance in a WLAN (Wireless Local Area Network, Wave Local Area Network) standardized by IEEE802.11 and is ready for fluctuation of a reception environment.

It is to be noted that, before the communication system of the present disclosure is described, a contrivance for packet transmission by an A-MSDU (Aggregation-MAC Protocol Data Unit) standardized by IEEE802.11 is described.

The A-MSDU method is a communication method standardized by IEEE802.11 and implements a high efficiency of packet communication by connecting, after synchronization necessary for reception and acquisition of a parameter are completed at a packet top portion (hereinafter referred to as preamble), a plurality of pieces of data (A-MPDU sub-frame) (hereinafter referred to as sub-frame) and transmitting the connected data as one big data (frame).

Further, it can be known whether or not a plurality of sub-frames has been received correctly by receiving a response signal (Block Ack) from the reception side after completion of transmission of a packet A particular example of communication by the A-MPDU method is described with reference to a timing chart of FIG. 1. For example, in case of an example of communication in which data is transmitted to an access point (base station) APa from a slave unit STA (STAtion), namely, in the case where the slave unit STA functions as a transmission apparatus and the access point APa functions as a reception apparatus, communication is performed as indicated by the timing chart of FIG. 1.

At time t0, if the slave unit STA transmits a preamble PA, then the access point APa receives the preamble PA. At this time, the access point APa acquires synchronization and a parameter included in the received preamble PA and necessary for reception and adjusts reception setting on the basis of the acquired synchronization and parameter to prepare for reception of a succeeding sub-frame.

At time t1, the slave unit STA transmits a packet as a sub-frame Sub-A1 from among a plurality of sub-frames to the access point APa. At this time, the access point APa receives the sub-frame Sub-A1 and transmits a response signal (Block Ack) R1 from the reception side after reception of the packet is completed.

Thereafter, the slave unit STA transmits sub-frames Sub-A2 to Sub-A5 sequentially at timings of time t2 to time t5, respectively.

Further, at timings of time t2 to time t5, the access point APa receives the sub-frames Sub-A2 to Sub-A5 transmitted from the slave unit STA at individual timings and transmits response signals R2 to R5.

Then, the slave unit STA receives the response signals R2 to R5 and recognizes that the transmission is completed.

In communication of the A-MPDU method, the packet communication is implemented efficiently by connecting and transmitting a plurality of sub-frames into and as one preamble PA in this manner.

However, when a series of the operation is performed, for example, if an access point APb that can communicate with the access point APa but cannot communicate with the slave unit STA exists and transmission is started, for example, by the A-MPDU method also at time t11 as indicated in the lower stage of FIG. 1, then interference occurs at time t11 as indicated in the middle stage of FIG. 1. It is to be noted that FIG. 1 represents that the access point APb transmits sub-frames Sub-B1 to Sub-B4 at time t12 to time t15, respectively.

As a result, arising from that a transmission packet of the access point APb suffers from interference, the access point APa degrades in the reception environment and is disabled from receiving a transmission packet of the slave unit STA correctly.

In such a situation as just described, for example, in the case where the slave unit STA is transmitting a packet by the A-MPDU method, if it is possible to perform adjustment so as to improve the reception environment of the access point APa during transmission, then it is possible for the access point APa to increase the number of sub-frames that can be received correctly and improve the packet reception success rate. As a result, stabilized communication in a WLAN can be implemented.

However, such a contrivance as just described does not exist in the 802.11 standard at present, and, in the case of FIG. 1, reception of a packet from the slave unit STA must be continued even if the access point APa is in a poor reception environment and, depending upon a condition, there is the possibility that even one sub-frame may not be received.

Therefore, in the present disclosure, for example, the access point APa of FIG. 1 issues a notification for prompting adjustment of the transmission parameter to the slave unit STA during packet reception such that the reception environment is improved or issues a notification for prompting adjustment of the transmission parameter to the access point APb such that the interfered amount is decreased.

In order to implement such an operation as just described, it is necessary for each of the wireless terminals such as the access points APa and APb and the slave unit STA to perform transmission and reception at the same time. Further, in the case of a wireless LAN, different from the 3GPP (Third Generation Partnership Project), not only a base station but also wireless terminals other than the base station must take a similar channel access procedure with a same frequency. Therefore, different from a simultaneous transmission and reception system in which difference frequencies are used as in the 3GPP, it is desirable to implement transmission of a response signal with an equal frequency to that of a data signal.

Accordingly, in the present disclosure, wireless terminals all of which are capable of performing transmission and reception within an equal frequency (full-duplex communication terminals) are used such that a wireless terminal (hereinafter referred to also as receiver) during packet reception like the access point APa transmits a response signal periodically.

Here, as a feedback parameter (hereinafter referred to as FP), information relating to a response signal or information relating to a reception environment is included in the response signal.

A wireless terminal (hereinafter referred to also as transmitter) during packet transmission like the slave unit STA refers to the FP in the received response signal to adjust the transmission parameter such that the reception environment is improved.

Also in a transmitter that interferes with the receiver like the access point APb, the FP in the received response signal is referred to similarly to adjust the transmission parameter so as to decrease the interfering amount. Consequently, in the access point APa, also under such a situation that interference occurs as depicted in FIG. 1, the reception environment is improved during packet reception and the success rate of packet reception can be increased. As a result, stabilized communication can be implemented.

2. First Embodiment

Now, an example of a configuration of a first embodiment of a communication system to which the technology of the present disclosure is applied is described with reference to FIG. 2.

Figure 2:
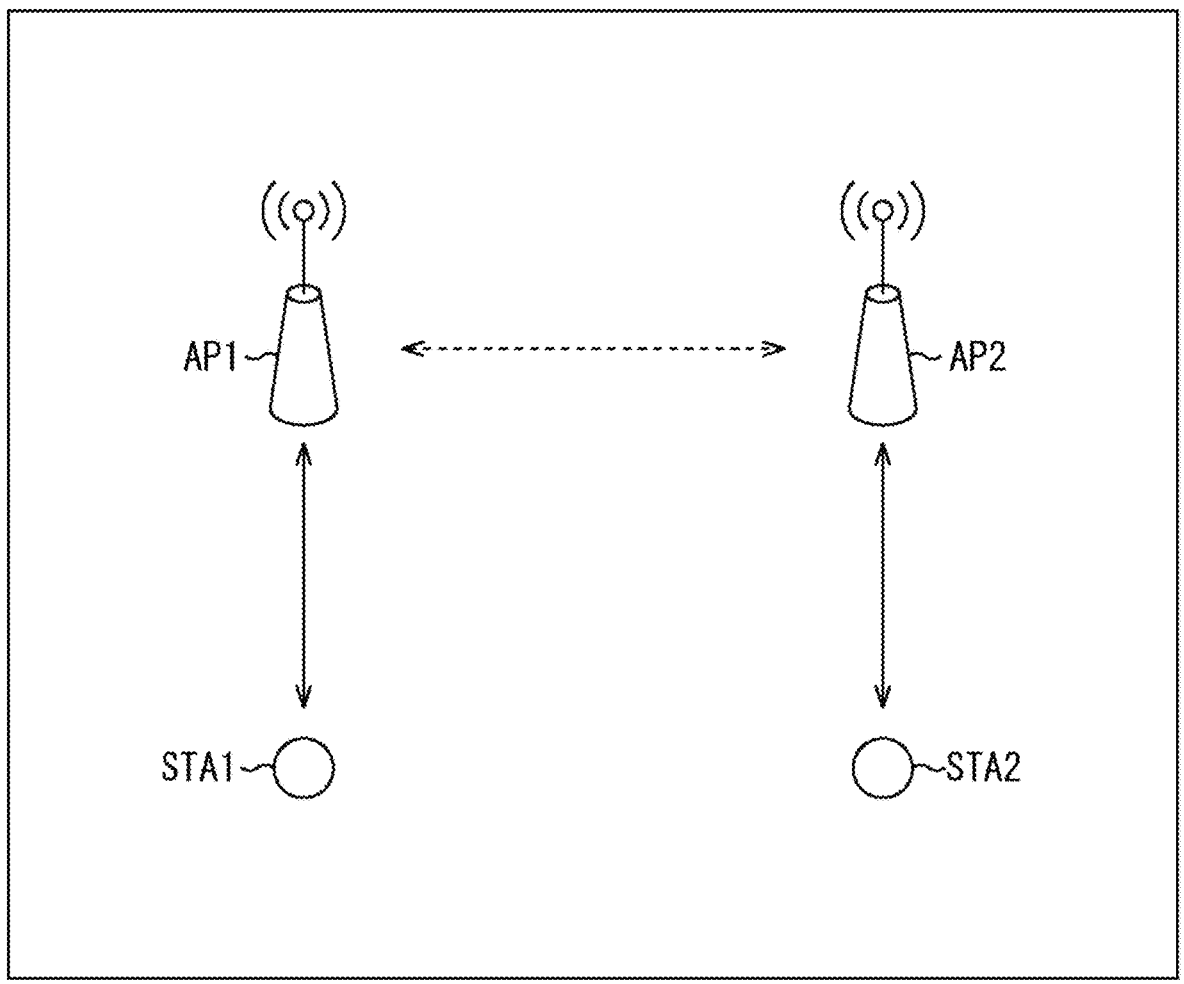
FIG. 2 is a view illustrating an example of a configuration of a communication system of the present disclosure.

The communication system of FIG. 2 includes access points AP1 and AP2 and slave units SAT1 and SAT2. It is assumed that, in the communication system of FIG. 2, the access point AP1 and the slave unit STAT belong to a network having BSS1 as a BSSID for identifying a network in which they are communicatable with each other through the access point AP1, and the access point AP2 and the slave unit STA2 belong to a network having BSS2 as a BSSID.

Further, it is assumed that the access point AP1 and the access point AP2 exist at positions at which they can detect signals of each other while the access point AP1 and the slave unit STA2 exist at positions at which they cannot detect signals of each other and the access point AP2 and the slave unit STA1 exist at positions at which they cannot detect signals of each other.

Accordingly, in the communication system of FIG. 2, the access point AP1 and the slave unit STA1 belong to the network of BSS1 by which they can communicate packets with each other and the access point AP2 and the slave unit STA2 belong to the network of BSS2 by which they can communicate packets with each other, and besides the access point AP1 and the access point AP2 are conditioned such that they can communicate signals of each other.

It is to be noted that the system configuration that becomes a target is not limited to this, and only it is sufficient if a plurality of communication apparatuses between which connection is established exists and, around each of the communication apparatuses, a communication apparatus to which connection is not established exists, and some other positional relation is allowable if such a condition as just described is satisfied.

Further, it is assumed that, in the description given hereinbelow, the slave unit STA1 belonging to the BSSID=BSS1 functions as a transmission apparatus that transmits a packet to the slave unit STA1 and the access point AP1 functions as a reception apparatus that receives the packet from the slave unit STA1. Meanwhile, the access point AP2 belonging to the BSSID=BSS2 functions as a transmission apparatus that transmits a packet to the slave unit STA2.

However, the transmission apparatus and the reception apparatus actually are the same communication apparatuses, and the transmission apparatus here is an apparatus in the case where the communication apparatus operates in a transmission mode and the reception apparatus is an apparatus in the case where the communication apparatus operates in a reception mode.

Example of Configuration of First Embodiment of Transmission Apparatus

Now, an example of a configuration of the first embodiment of the transmission apparatus corresponding to the slave unit STA1 and the access point AP2 of FIG. 2 is described with reference to FIG. 3.

Figure 3:
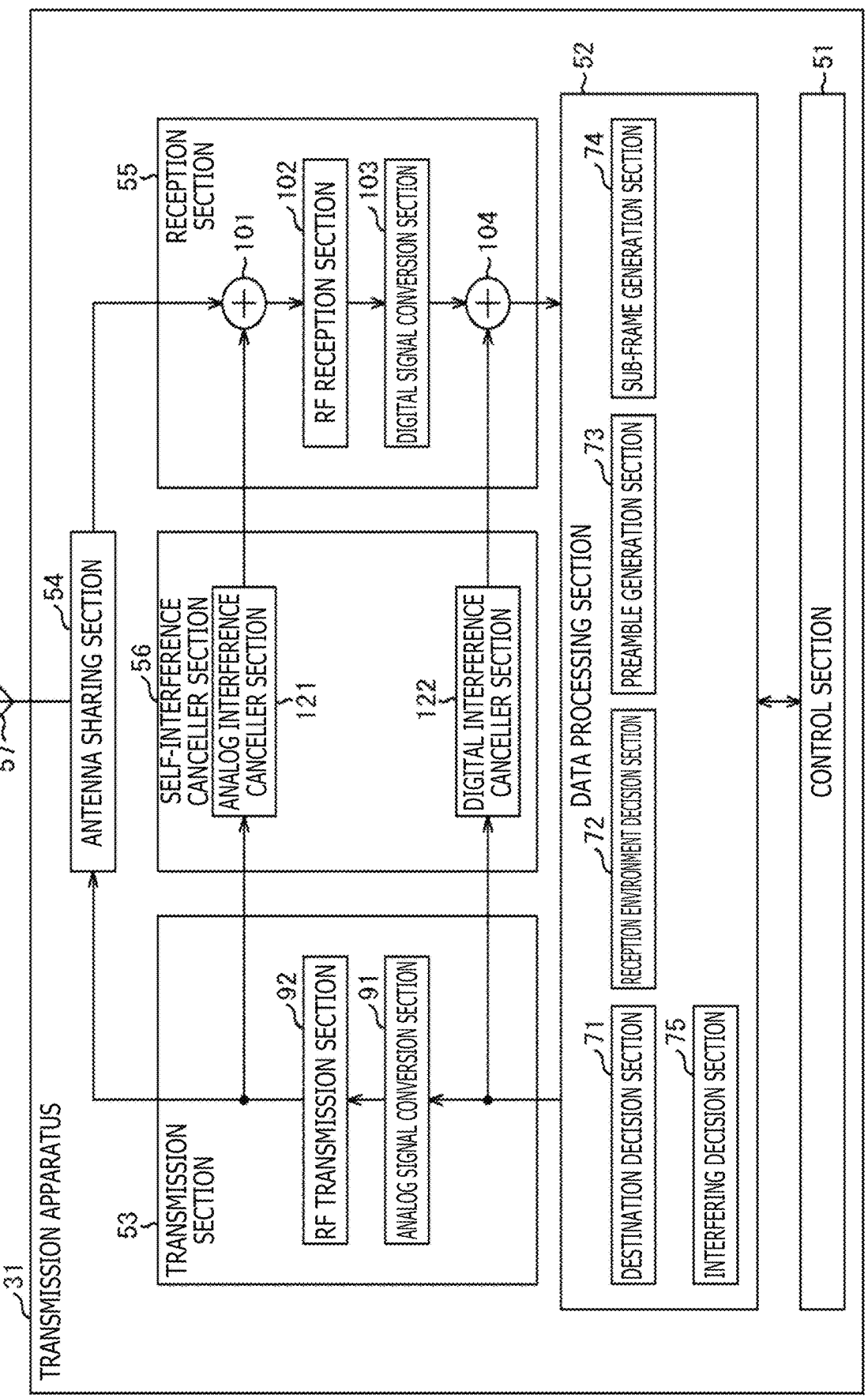
FIG. 3 is a view illustrating an overview of a first embodiment of a transmission apparatus of the communication system of the present disclosure.

The transmission apparatus 31 of FIG. 3 includes a control section 51, a data processing section 52, a transmission section 53, an antenna sharing section 54, a reception section 55, a self-interference canceller section 56 and an antenna 57.

The control section 51 includes a processor, a memory and so forth, and controls overall operation of the transmission apparatus 31 and sets a transmission parameter for adjusting the transmission power and so forth of the transmission section 53.

The data processing section 52 executes generation of a data signal to be transmitted with a packet and extraction of a data signal from a demodulated reception signal as processes for a data signal used for communication.

More particularly, the data processing section 52 includes a destination decision section 71, a reception environment decision section 72, a preamble generation section 73, a sub-frame generation section 74 and an interfering decision section 75.

The destination decision section 71 decides whether or not a response signal transmitted thereto from a reception apparatus 131 (FIG. 4) every time a packet is received in a unit of a sub-frame has a destination that is destined for the own apparatus (transmission apparatus 31 itself).

The reception environment decision section 72 decides on the basis of an FP (feedback parameter: reception information) included in a response signal transmitted for the own apparatus from the reception apparatus 131 (FIG. 4) through the reception section 55 whether or not it is necessary to improve the reception environment of the reception apparatus 131 (FIG. 4) and outputs a result of the decision to the control section 51.

The preamble generation section 73 generates a preamble for transmission data formed from a frame of a unit of an MPDU when a packet is to be transmitted and outputs the preamble to the transmission section 53 so as to be transmitted to the reception apparatus 131.

The sub-frame generation section 74 generates a sub-frame from transmission data of a unit of an MPDU when a packet is to be transmitted, and outputs the sub-frame to the transmission section 53 so as to be transmitted to the reception apparatus 131.

Figure 4:
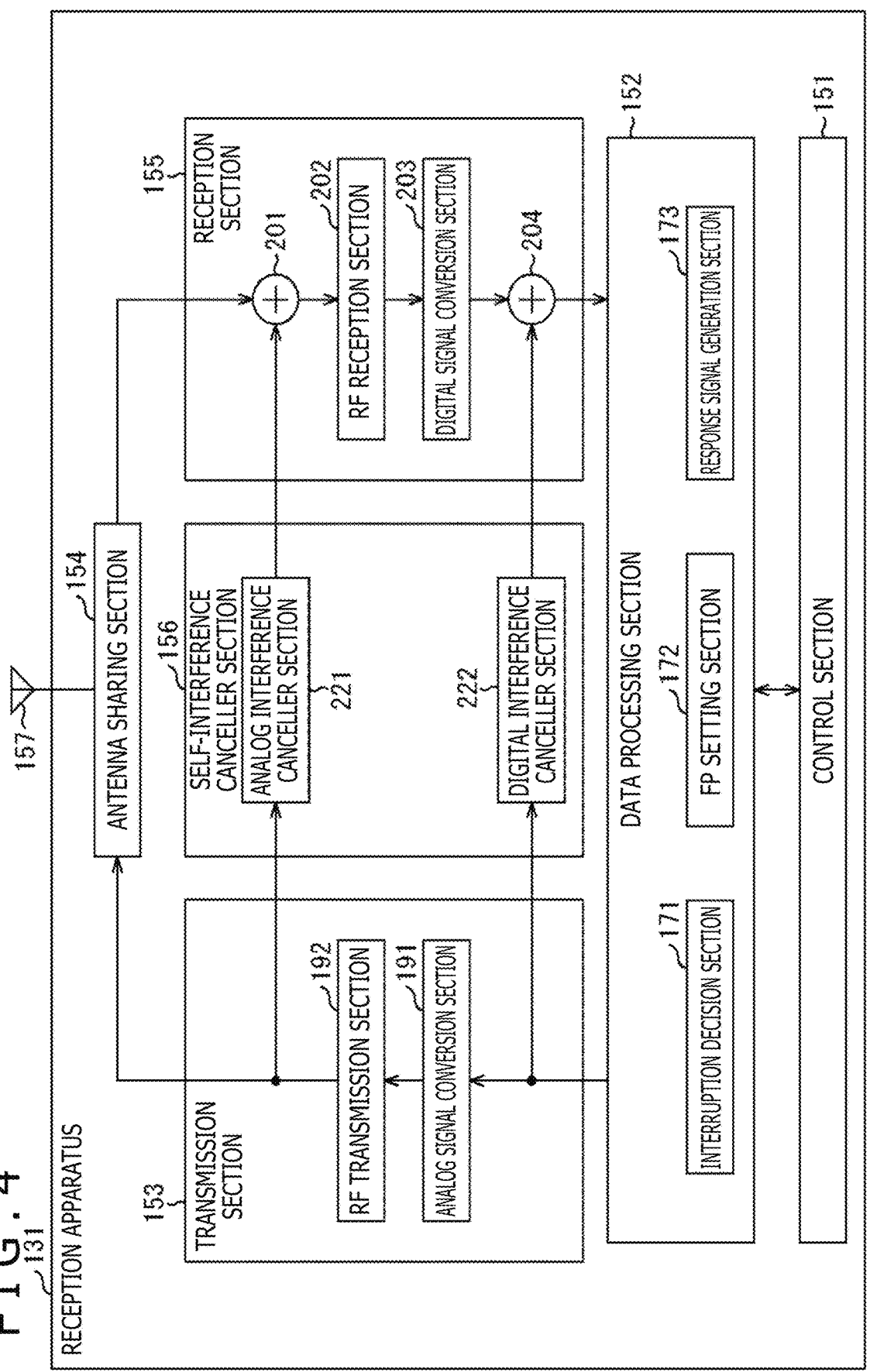
FIG. 4 is a view illustrating an overview of the first embodiment of a reception apparatus of the communication system of the present disclosure.

The sub-frame generation section 74 generates an interruption frame based on a configuration of a sub-frame. The interruption frame is a signal for declaring interruption of transmission of a current sub-frame when it becomes necessary to re-adjust the transmission parameter and re-transmit a new frame of a unit of an MPDU beginning with the preamble in order to improve the reception environment of the reception apparatus 131 on the basis of the FP from the reception apparatus 131 (FIG. 4).

More particularly, the middle-stage frame is a kind of sub-frame based on a configuration of a sub-frame and is a frame when a middle-stage flag (Break Flag) included in a sub-frame is placed into an on state (Break Flag==1) that declares interruption of transmission of the sub-frame. In this manner, a sub-frame that functions as an interruption frame indicates NULL in a region into which transmission data are to be placed.

On the other hand, when the middle-stage flag (Break Flag) included in a sub-frame is in an off state (Break Flag==0) that does not declare interruption of transmission of a sub-frame, also transmission data are transmitted together and the sub-frame functions as an ordinary sub-frame. It is to be noted that the interruption frame is hereinafter described in detail with reference to FIG. 7.

The interfering decision section 75 decides, on the basis of an FP included in a response signal that is not destined for the own apparatus through the reception section 55, presence or absence of suppression of interference that is given by the own apparatus to the reception apparatus 131 (FIG.

4) from which the response signal has been sent, and outputs a result of the decision to the control section 51.

The control section 51 sets a transmission parameter on the basis of a result of decision of the reception environment decision section 72 and a result of decision of the interfering decision section 75.

The transmission section 53 generates a packet to be transmitted from a data signal generated by the data processing section 52 and causes the packet to be transmitted from the antenna 57 through the antenna sharing section 54.

More particularly, the transmission section 53 includes an analog signal conversion section 91 and an RF (Radio Frequency) transmission section 92.

The analog signal conversion section 91 converts a data signal generated by the data processing section 52 into an analog signal and outputs the analog signal to the RF transmission section 92.

The RF transmission section 92 performs frequency conversion and power amplification of the analog signal generated by the analog signal conversion section 91 and transmits the resulting analog signal as a transmission signal from the antenna 57 through the antenna sharing section 54.

The antenna sharing section 54 radiates the transmission signal generated by the transmission section 53 as electromagnetic waves through the antenna 57. Further, the antenna sharing section 54 outputs electromagnetic waves received through the antenna 57 as a reception signal to the reception section 55.

The reception section 55 extracts a data signal from the reception signal received by the antenna 57 through the antenna sharing section 54 and outputs the data signal to the data processing section 52.

More particularly, the reception section 55 includes addition sections 101 and 104, an RF reception section 102 and a digital signal conversion section 103.

The addition section 101 adds a reception signal supplied from the antenna sharing section 54 and a cancel signal supplied from the self-interference canceller section 56 to cancel interference between analog signals when radio waves in a same frequency band are used to perform communication and outputs a resulting signal to the RF reception section 102.

The RF reception section 102 performs frequency conversion and power amplification of the reception signal received through the antenna 57 to convert the reception signal into an analog signal that can be easily converted into a digital signal. This RF reception section 102 includes an LNA (Low Noise Amplifier), and the gain of the LNA is controlled by AGC (Auto Gain Control) in response to the reception strength.

The digital signal conversion section 103 converts the analog signal supplied from the RF reception section 102 into a digital signal and outputs the digital signal to the addition section 104.

The addition section 104 adds the reception signal supplied from the digital signal conversion section 103 and having been converted into a digital signal and a cancel signal supplied from the self-interference canceller section 56 to cancel interference of the digital signal when radio waves of a same frequency band are used for communication, and outputs a resulting signal to the data processing section 52.

The self-interference canceller section 56 has a general function that is necessitated for a transmission apparatus that performs a transmission operation and a reception operation with a same frequency. When the transmission apparatus 31 performs transmission and reception at the same time, a signal for canceling interference using the transmission signal as a source and is added to the reception signal such that the transmission signal of the own apparatus does not interfere with the reception signal.

More particularly, the self-interference canceller section 56 includes an analog interference canceller section 121 and a digital interference canceller section 122.

The analog interference canceller section 121 generates a signal for cancelling interference of an analog signal from a transmission signal outputted from the RF transmission section 92 and outputs the signal to the addition section 101.

The digital interference canceller section 122 generates a signal for cancelling interference of a digital signal from a transmission signal outputted from the data processing section 52 and outputs the signal to the addition section 104.

It is to be noted here that, although the self-interference canceller section 56 includes two different interference canceller sections for an analog signal and a digital signal including the analog interference canceller section 121 and the digital interference canceller section 122, if an interference suppression characteristic is sufficient, then only one of them may be used.

Example of Configuration of First Embodiment of Reception Apparatus

Now, an example of a configuration of the first embodiment of the reception apparatus corresponding to the access point AP1 of FIG. 2 is described with reference to FIG. 4. It is to be noted that the reception apparatus 131 of FIG. 4 and the transmission apparatus 31 of FIG. 3 are basically the same in configuration. In particular, although the reception apparatus 131 of FIG. 4 includes a control section 151, a data processing section 152, a transmission section 153, an antenna sharing section 154, a reception section 155, a self-interference canceller 156, and an antenna 157, they correspond to the control section 151, the data processing section 152, the transmission section 153, the antenna sharing section 154, the reception section 155, the self-interference canceller section 156, and the antenna 157, respectively.

Further, an analog signal conversion section 191 and an RF transmission section 192 of the transmission section 153 and addition sections 201 and 204, an RF reception section 202 and a digital signal conversion section 203 of the reception section 155 correspond to the analog signal conversion section 191 and the RF transmission section 192 of the transmission section 153 and the addition sections 201 and 204, the RF reception section 202, and the digital signal conversion section 203 of the reception section 155, respectively.

Accordingly, description of the individual components of the reception apparatus 131 is omitted.

However, in the case of functioning as the reception apparatus 131, the configuration is different from the transmission apparatus 31 in that the control section 151 does not set a transmission parameter and further in processing by the data processing section 152. Therefore, functions of the data processing section 152 are described here.

The data processing section 152 includes an interruption decision section 171, an FP setting section 172, and a response signal generation section 173.

The interruption decision section 171 decides, on the basis of whether or not the interruption flag in a sub-frame supplied through the reception section 155 is on and the sub-frame functions as an interruption frame, whether or not a middle stage of transmission of a sub-frame is declared, and outputs a result of the decision to the control section 151.

The FP setting section 172 sets an FP (feedback parameter) in response to a reception situation and supplies the FP to the response signal generation section 173.

The response signal generation section 173 generates and outputs a response signal including the FP parameter to the transmission section 153.

Example of Sequence in Communication System of First Embodiment

Now, an example of a sequence in the communication system of the first embodiment is described with reference to a timing chart of FIG. 5.

The access point AP1 that functions as the reception apparatus 131 receives a transmission packet from the slave unit STA1 that functions as the transmission apparatus 31 and periodically transmits a response signal (for both of ACK/NACK) including the FP to the slave unit STA1.

The slave unit STA1 and the access point AP2 decide on the basis of the FP in the received response signal whether or not it is necessary to improve the reception environment of the access point AP1, and adjust the transmission parameter.

However, for example, even if a new transmission parameter is applied suddenly while the slave unit STA1 is transmitting a packet, the access point AP1 may possibly fail to notice the change and may not normally acquire the packet.

More particularly, since the access point AP1 that functions as the reception apparatus 131 adjusts the AGC of the LNA with a preamble, there is the possibility that, if the slave unit STA1 that functions as the transmission apparatus 31 suddenly changes the transmission power, then there is the possibility that, with the set AGC, a packet may not be received correctly.

Further, in the case where the slave unit STA1 that functions as the transmission apparatus 31 changes the modulation method, coincidence with data length information included in the preamble is lost and it cannot be recognized at which position the sub-frame is delimited.

Accordingly, in order for the slave unit STA1 that functions as the transmission apparatus 31 to apply a new transmission parameter from the middle, it is necessary to re-transmit, during transmission of a packet, a frame of a unit of an A-MPDU on which the new transmission parameter is reflected.

In short, transmission of a frame of a unit of an A-MPDU currently being transmitted is interrupted, and a new frame of a unit of the A-MPDU is re-transmitted with the new transmission parameter applied.

More particularly, it is necessary to transmit a renewed preamble (hereinafter referred to as new preamble). To this end, the access point AP1 that functions as the reception apparatus 131 must grasp in advance at which timing a new preamble (a new data signal of a unit of an A-MPDU) is transmitted thereto.

Therefore, the transmission apparatus 31 of the present disclosure transmits, to the reception apparatus 131, a sub-frame indicating that the transmission apparatus 31 interrupts packet transmission once before it transmits a new preamble and then transmits the new preamble (such sub-frame is hereinafter referred to as interruption frame).

In particular, the slave unit STA1 that functions as the transmission apparatus 31 sets an interruption flag to the sub-frame and transmits, in the case where transmission of a sub-frame is not to be interrupted but is to be continued, the sub-frame as an ordinary sub-frame with the interruption flag set to off. On the other hand, in the case where a new transmission parameter is to be applied, the slave unit STA1 that functions as the transmission apparatus 31 sets the interruption flag to on and transmits the sub-frame as an interruption flag to the access point AP1.

The access point AP1 that functions as the reception apparatus 131 receives the sub-frame including the interruption flag, and continues, in the case where the interruption flag is off, reception of the sub-frame as an ordinary sub-frame. On the other hand, in the case where the interruption flag of the received sub-frame is on, since transmission of a sub-frame is interrupted thereafter, the access point AP1 that functions as the reception apparatus 131 aborts its reception operation and starts a carrier sense operation.

This makes it possible for the access point AP1 that functions as the reception apparatus 131 to detect a new preamble sent thereto from the slave unit STA1 that functions as the transmission apparatus 31.

Figure 5:
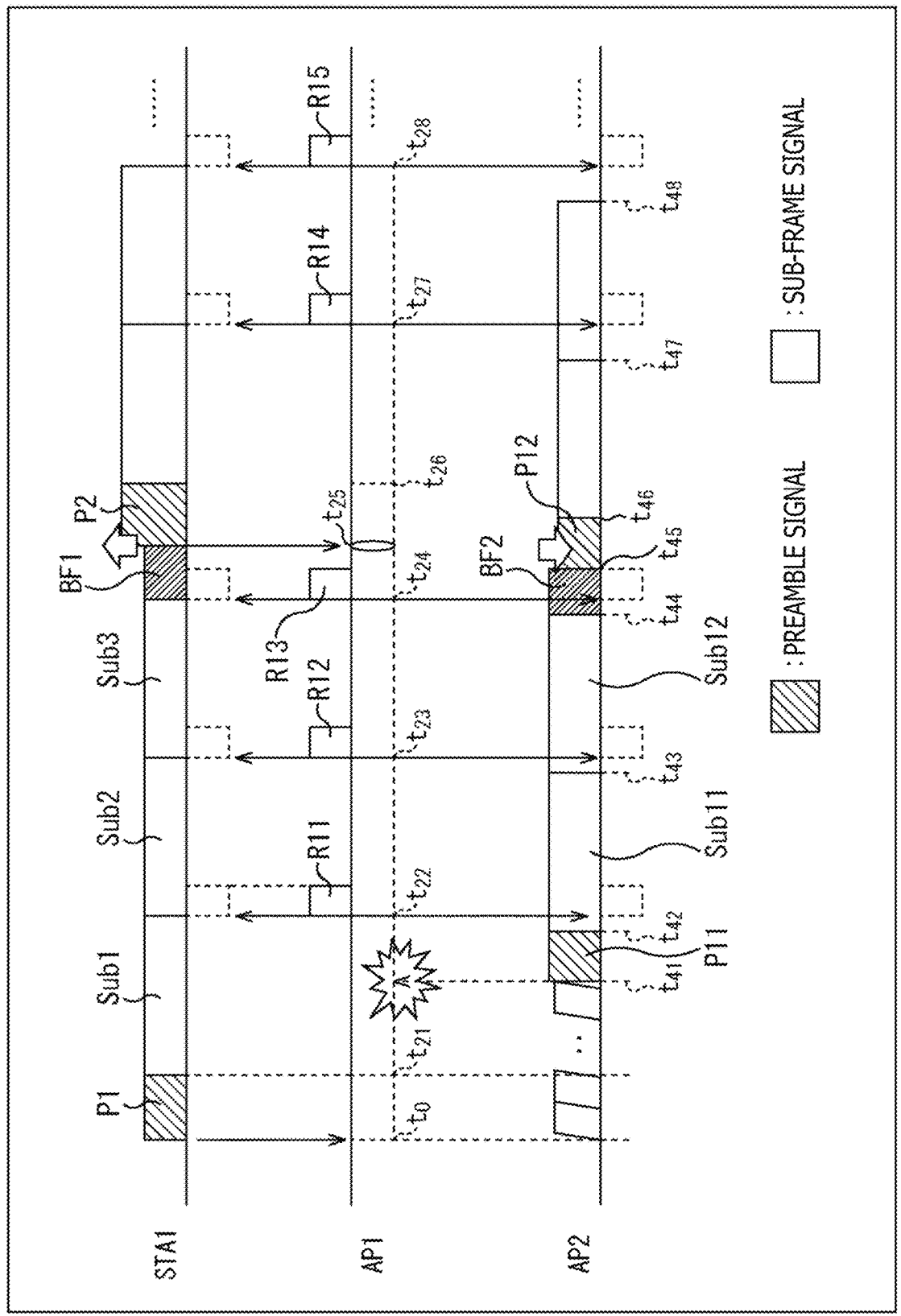
FIG. 5 is a view illustrating an example of a sequence of the communication system of the first embodiment.

In particular, in FIG. 5, at time t0, the slave unit STA1 that functions as the transmission apparatus 31 transmits a preamble P1, and the access point AP1 that functions as the reception apparatus 131 receives the preamble P1.

Thereafter, at time t21, the slave unit STA1 that functions as the transmission apparatus 31 transmits a sub-frame Sub1 in which the interruption flag is off, and the access point AP1 that functions as the reception apparatus 131 receives the sub-frame Sub1. At this timing, since the interruption flag in the sub-frame Sub1 is off, the access point AP1 that functions as the reception apparatus 131 receives the sub-frame Sub1 as an ordinary sub-frame and recognizes that also a next sub-frame will be transmitted thereto as usual.

At time t22, the slave unit STA1 that functions as the transmission apparatus 31 transmits a sub-frame Sub2 in which the interruption flag is off, and the access point AP1 that functions as the reception apparatus 131 receives the sub-frame Sub2. Also at this timing, since the interruption flag is off, the access point AP1 that functions as the reception apparatus 131 receives the sub-frame Sub2 as an ordinary sub-frame and recognizes that also a next sub-frame will be transmitted thereto as usual.

At this time, the access point AP1 that functions as the reception apparatus 131 transmits a response signal R11 that reflects a reception situation of the immediately preceding sub-frame Sub1 to the slave unit STA1 that functions as the transmission apparatus 31, and the slave unit STA1 receives the response signal R11.

At time t23, the slave unit STA1 that functions as the transmission apparatus 31 transmits a sub-frame Sub3 in which the interruption flag is off, and the access point AP1 that functions as the reception apparatus 131 receives the sub-frame Sub3. Also at this timing, since the interruption flag is off, the access point AP1 that functions as the reception apparatus 131 receives the sub-frame Sub3 as an ordinary sub-frame and recognizes that also a next sub-frame will be transmitted thereto as usual.

At this time, the access point AP1 that functions as the reception apparatus 131 transmits a response signal R12 that reflects a reception situation of the immediately preceding sub-frame Sub2 to the slave unit STA1 that functions as the transmission apparatus 31, and the slave unit STA1 receives the response signal R12.

At time t24, the slave unit STA1 that functions as the transmission apparatus 31 recognizes the FP of the response signal R12 and, for example, in such a case where there is no problem even if the transmission output power is increased, the slave unit STA1 transmits a sub-frame in which the interruption flag is on as an interruption flag BF1 in order to change the transmission parameter. The access point AP1 that functions as the reception apparatus 131 receives the interruption flag BF1.

At this timing, since the interruption flag in the sub-frame is on, the access point AP1 that functions as the reception apparatus 131 recognizes the sub-frame as an interruption flag BF1 and recognizes that transmission of a sub-frame is aborted later and a new preamble according to the new transmission parameter will be transmitted thereto.

The access point AP1 that functions as the reception apparatus 131 transmits a response signal R13 that reflects a reception situation of the immediately preceding sub-frame Sub3 to the slave unit STA1 that functions as the transmission apparatus 31.

Then, at time t25, the slave unit STA1 that functions as the transmission apparatus 31 transmits a new preamble P2 in a state in which the transmission output thereof is increased from the transmission output used for the immediately preceding transmission, and the access point AP1 that functions as the reception apparatus 131 receives the new preamble P2. Further, the access point AP1 that functions as the reception apparatus 131 starts a carrier sense for detecting a new preamble.

It is to be noted that a square that indicates the preamble P2 in the figure is depicted greater in an arrow mark direction than an immediately preceding sub-frame or preamble so as to represent that the transmission output power is increased.

At this time, since the access point AP1 functions as the reception apparatus 131 that receives the new preamble P2 by a carrier sense, it re-calculates the data length to be described in the new preamble P2 such that it fits in an acquired TXOP (Transmission Opportunity: continuously transmittable time period). Further, the access point AP1 sets an AGC of the LNA of the RF reception section 202 on the basis of the information of the preamble. This makes it possible to appropriately receive a sub-frame of the new output power.

Since such processing as described above allows the slave unit STA1 that functions as the transmission apparatus 31 to adjust the transmission parameter in response to a reception situation on the basis of the FP included in the response signal supplied from the access point AP1 that functions as the reception apparatus 131, it is suppressed that it becomes impossible to receive a packet from the middle, for example, by a drop of the reception power and stabilized packet communication can be implemented. Further, since the transmission output power can be adjusted dynamically in response to a reception situation, also communication by a mobile apparatus can be stabilized.

In the meantime, the access point AP2 that belongs to BSS2 different from BSS1 that is a network of the access point AP1 transmits a preamble from time t41 and transmits a sub-frame Sub11 in which the interruption flag is off at time t42. Then, the access point AP2 receives a response signal R11 from the access point AP1 of the reception apparatus 131 that has a different BSSID.

Further, at time t43, the access point AP2 transmits a sub-frame Sub12 in which the interruption flag is off and receives a response signal R12 from the access point AP1 of the reception apparatus 131 having a different BSSID.

At time t44, the access point AP2 that functions as the transmission apparatus 31 confirms the FP of the response signal R12 and, for example, in the case where interfering level is so high that it is necessary to suppress the transmission output power, the access point AP2 transmits a sub-frame in which the interruption flag is on as an interruption frame BF2 in order to change the transmission parameter. Then, the slave unit STA2 not depicted that functions as the reception apparatus 131 receives the interruption frame BF2.

At this timing, since the interruption flag in the sub-frame is on, the slave unit STA2 that functions as the reception apparatus 131 recognizes that transmission of a sub-frame will be aborted and a new preamble according to a new transmission parameter will be transmitted thereto.

Then at time t45, the access point AP2 that functions as the transmission apparatus 31 transmits a new preamble P12 in a state in which the transmission output power thereof is suppressed from that used for the immediately preceding transmission to reduce interfering level of the access point AP1 that functions as the reception apparatus 131.

It is to be noted that a square that indicates the preamble P12 in the figure is depicted greater in an arrow mark direction than an immediately preceding sub-frame or preamble so as to represent that the transmission output power is increased.

Since such processing as described above makes it possible for the access point AP2 that functions as the transmission apparatus 31 to adjust the transmission parameter in response to a reception situation on the basis of the FP included in the response signal supplied from the access point AP1 that functions as the reception apparatus 131 having a different BSSID, it is possible to suppress the transmission output power on the basis of the presence/absence of interfering.

This makes it possible to suppress that the reception power is dropped by interference during communication to disable reception of a packet from the middle and implement stabilized packet communication. Further, since the transmission output power can be adjusted dynamically in response to a reception situation with interference taken into consideration, also communication by a mobile apparatus can be stabilized.

It is to be noted that, although FIG. 5 depicts an example in which both the slave unit STA1 and the access point AP2 adjust the transmission parameter, when the reception environment of the access point AP1 improves if one of the slave unit STA1 or the access point AP2 adjusts the transmission parameter, it is desirable for only one of them to adjust the transmission parameter.

For example, in the case where the access point AP2 that functions as the transmission apparatus 31 of the interfering side decreases the transmission power in response to a response signal transmitted from the access point AP1 that functions as the reception apparatus 131, the slave unit STA1 that functions as the transmission apparatus 31 may continue packet transmission without adjusting the transmission parameter. In contrast, in the case where the access point AP2 that functions as the transmission apparatus 31 of the interfering side does not perform adjustment of the transmission power, the slave unit STA1 must improve the reception environment by increasing the transmission power or by like means.

Example of Configuration of Response Signal in First Embodiment

Now, an example of a configuration of a response signal (response signal frame) in the first embodiment is described with reference to FIG. 6.

The response signal is supposed to define a new frame format (new Frame Control number) for a control frame defined in the IEEE802.11a standard.

Figure 6:
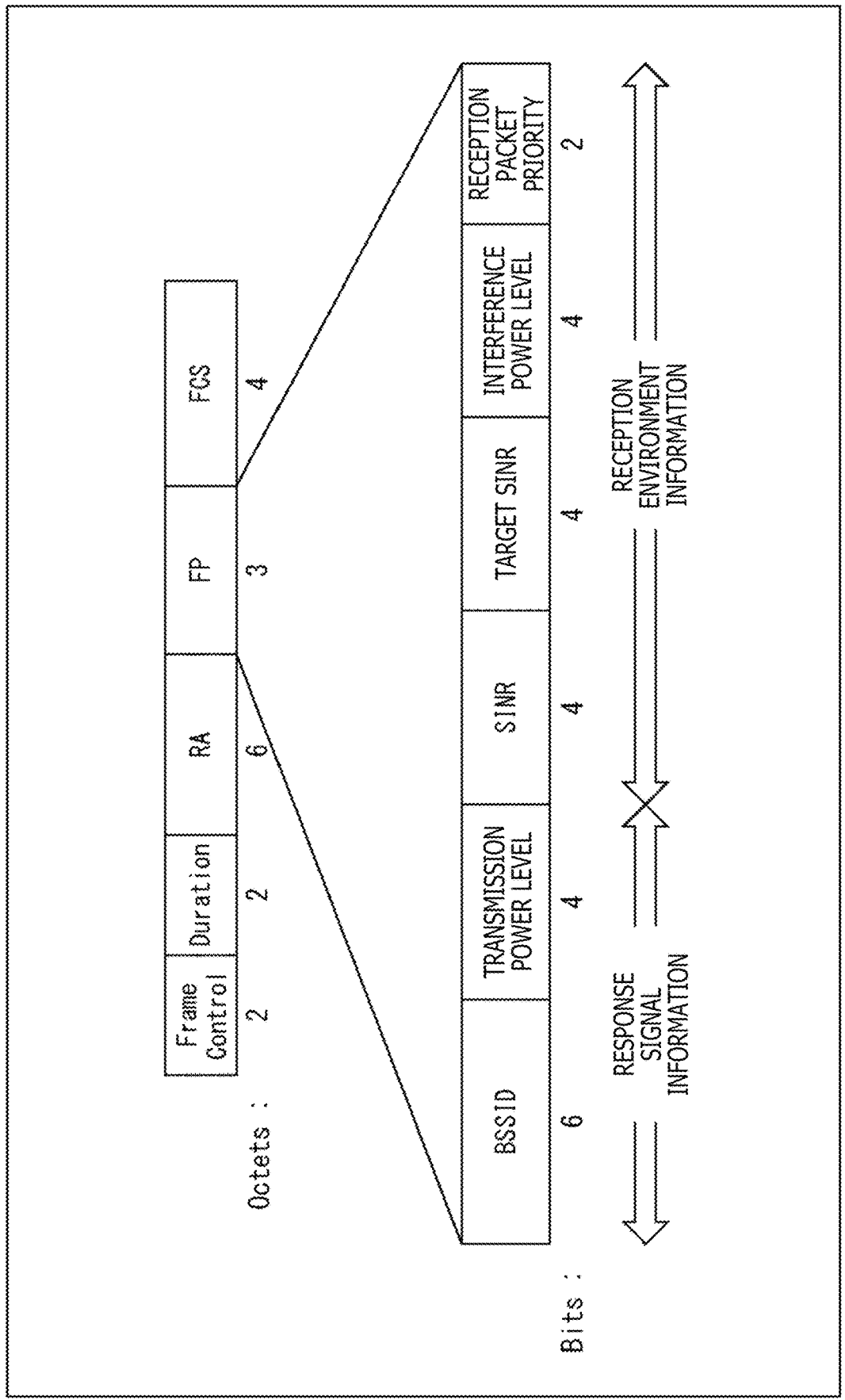
FIG. 6 is a view illustrating an example of a configuration of the first embodiment of a response signal frame.

The upper stage of FIG. 6 represents the entire format of the response signal, and the lower stage represents a format of the FP (feedback parameter).

As depicted in the upper stage of FIG. 6, the response signal frame includes Frame Control, Duration, RA (Receiver Address), FP (Feedback Parameter), and FCS (Frame Check Sequence).

Frame Control is data of a frame number of two bytes, and has placed therein information for identifying a type of a frame by a frame number and can identify at least NACK including ACK and FP.

Duration is data of two bytes and is a scheduled period for use of a wireless circuit.

RA (Receiver Address) is data of six bytes and is the address of a reception apparatus.

FP (Feedback Parameter) is data of three bytes and is a feedback parameter.

FCS (Frame Check Sequence) is data of four bytes and is an error correction detection part.

Meanwhile, information in the FP indicated in the lower stage of FIG. 6 is sufficient if it includes information relating to a response signal (response signal information) and information relating to a reception environment (reception environment information) and is not limited to those of the present working example.

More particularly, the FP includes information regarding BSSID, transmission power level, SINR, target SINR, interference power level, and a reception packet priority.

BSSID is an identifier of each BSS.

Transmission power level is transmission power information of the response signal.

SINR is the latest SINR (Signal to Interference and Noise Ratio) information in a packet being received. For example, in the case of ACK/NACK, SINR is SINR information of a received sub-frame.

Target SINR is SINR information necessary to demodulate a packet being received correctly.

Interference power level is the total of reception power of interference waves being received other than a packet being received.

Reception packet priority is AC (Access Category) information of a packet being received.

It is to be noted that, although the response signal is supposed to transmit for each sub-frame together with ACK/NACK, this is not restrictive, and for example, a response signal may be transmitted together with Block Ack for each plurality of sub-frames or a response signal may be transmitted periodically without depending upon a sub-frame reception timing.

Example of Configuration of Interruption Frame

Now, an example of a configuration of an interruption frame that is transmitted to the reception apparatus 131 before the transmission apparatus 31 starts transmission of a new preamble is described with reference to FIG. 7.

The interruption frame of the present disclosure is based on the configuration of the A-MPDU sub-frame defined in the IEEE802.11n standard and is characterized in that it includes Break Flag in MPDU Delimiter.

Figure 7:
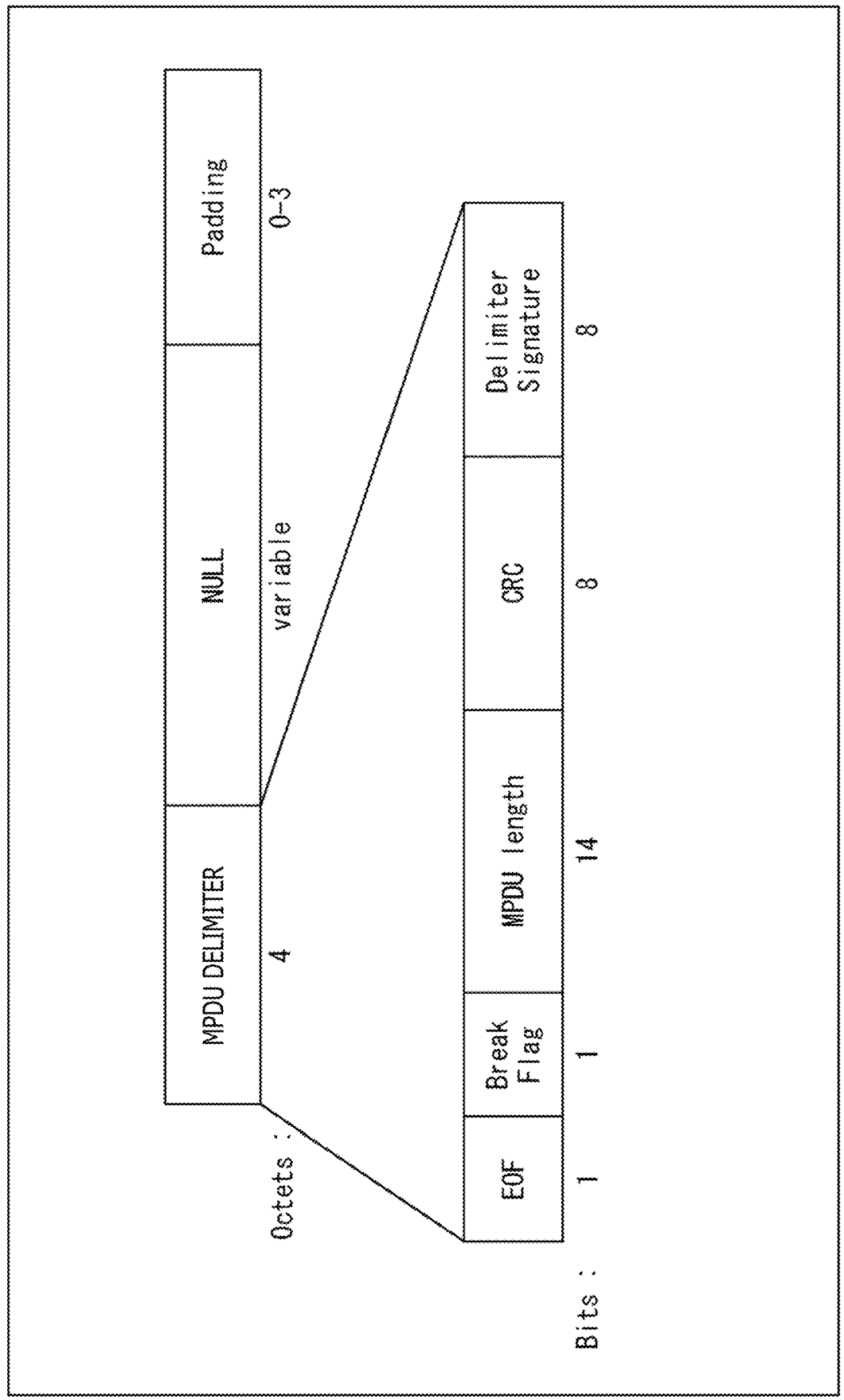
FIG. 7 is a view illustrating an example of a configuration of an interruption frame.

As depicted in the upper stage of FIG. 7, the interruption frame includes MPDU delimiter of four bytes, NULL of a variable length and padding of zero to three bytes. MPDU delimiter corresponds to the header of the interruption frame. Meanwhile, NULL of a variable length is a region into which transmission data are placed in an original sub-frame.

As depicted in the lower stage of FIG. 7, MPDU delimiter includes EOF of one bit, Break Flag of one bit, MPDU length of 14 bits, CRC of eight bits, and Delimiter Signature of eight bits.

Among them, Break Flag is the interruption frame, and when 1 is set, interruption of transmission of a sub-frame is set, but when 0 is set, transmission of a sub-frame is continued.

In the case where Break Flag in MPDU Delimiter is "1" when reception of an A-MPDU sub-frame is started as before, the reception apparatus 131 recognizes that this signal is an interruption frame from among sub-frames and aborts the reception operation and starts a carrier sense operation after reception by a data length described in MPDU length is completed.

In the interruption frame, a portion of an ordinary A-MPDU sub-frame at which data information is to be included is NULL, and information of NULL can be used to provide a preparation period until the reception apparatus 131 starts a carrier sense operation.

In an ordinary A-MPDU sub-frame, data information is placed at a portion corresponding to NULL and Break Flag is "0." In other words, the interruption frame is a kind of sub-frame and is that one of sub-frames in which the middle-stage flag is set to 1 and the data information is NULL.

It is to be noted that the configuration of MPDU Delimiter other than Break Flag is similar to the configuration of an ordinary sub-frame, and description of it is omitted.

Transmission Process of Transmission Apparatus in First Embodiment

Figure 8:
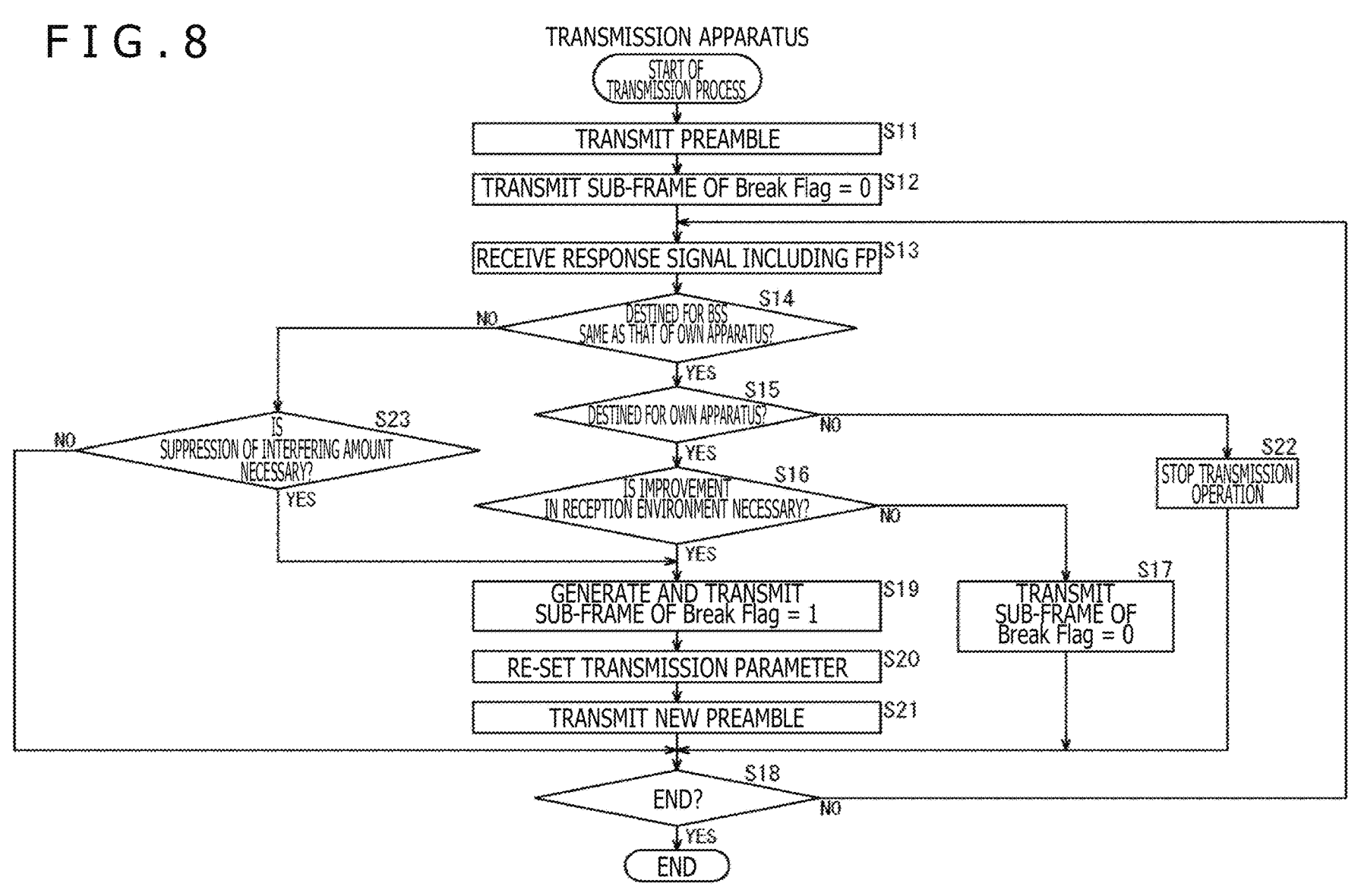

Now, a transmission process of the transmission apparatus in the first embodiment is described with reference to a flow chart of FIG. 8.

In step S11, the control section 51 controls the data processing section 52 to generate a preamble and controls the transmission section 53 to transmit the preamble to the reception apparatus 131 through the antenna 57. More particularly, the preamble generation section 73 of the data processing section 52 generates a preamble and causes the preamble to be transmitted from the transmission section 53 to the reception apparatus 131 through the antenna 57.

In step S12, the control section 51 controls the data processing section 52 to generate a sub-frame and controls the transmission section 53 to transmit the preamble to the reception apparatus 131 through the antenna 57. More particularly, the sub-frame generation section 74 of the data processing section 52 generates an ordinary sub-frame indicating that a sub-frame of the interruption flag Break Flag==0 is not interrupted and causes the ordinary sub-frame to be transmitted from the transmission section 53 to the reception apparatus 131 through the antenna 57.

In step S13, the data processing section 52 controls the reception section 55 to receive a response signal that is transmitted thereto from the reception apparatus 131 in response to the transmission of the sub-frame and including an FP according to a reception situation when the sub-frame is received.

In step S14, the data processing section 52 controls the destination decision section 71 to decide on the basis of the BSSID in the FP of the received response signal whether or not the BSSID is same as that of the BSS to which the own apparatus belongs. In the case where it is decided at step S14 that the BSSID is same as that of the BSS to which the own apparatus belongs, the processing advances to step S15.

In step S15, the data processing section 52 controls the destination decision section 71 to decide on the basis of information (RA) of the address of the reception apparatus 131 in the received response signal whether or not the response signal is destined for the own apparatus.

In the case where it is decided in step S15 that the response signal is destined for the own apparatus, the processing advances to step S16.

In step S16, the control section 51 controls the reception environment decision section 72 in the data processing section 52 to decide on the basis of the information in the FP of the response signal whether or not it is necessary to improve the reception environment. More particularly, the reception environment decision section 72 decides whether or not it is necessary to improve the reception environment on the basis of, for example, whether or not the SINR information in the FP is much lower than the target SINR information or whether or not a reception failure time number of a transmitted sub-frame exceeds a fixed threshold value or the like.

In the case where it is decided in step S16 that it is not necessary to improve the reception environment, the processing advances to step S17.

In step S17, the control section 51 controls the data processing section 52 to generate a sub-frame and controls the transmission section 53 to transmit the sub-frame to the reception apparatus 131 through the antenna 57. More particularly, the sub-frame generation section 74 of the data processing section 52 generates an ordinary sub-frame in which the interruption flag Break Flag=0 (interruption flag is off) indicating that transmission of a sub-frame is not interrupted and causes the ordinary sub-frame to be transmitted from the transmission section 53 to the reception apparatus 131 through the antenna 57.

In step S18, the control section 51 decides whether or not an instruction to end the processing is received, and in the case where an instruction to end is received, the processing is ended.

In the meantime, in the case where an instruction to end is not received in step S18, the processing returns to step S13.

On the other hand, in the case where it is decided in step S16 that it is necessary to improve the reception environment, the processing advances to step S19.

In step S19, the control section 51 controls the data processing section 52 to generate a sub-frame of the interruption flag Break Flag=1 and controls the transmission section 53 to transmit the sub-frame to the reception apparatus 131 through the antenna 57. More particularly, the sub-frame generation section 74 of the data processing section 52 generates a sub-frame, which indicates that transmission of the sub-frame of the interruption flag Break Flag=1 (interruption flag is on) is to be interrupted, as an interruption frame and causes the interruption frame to be transmitted from the transmission section 53 to the reception apparatus 131 through the antenna 57.

In step S20, the control section 51 adjusts the transmission parameter on the basis of the FP included in the response signal and adjusts, for example, the transmission power and the modulation method of the transmission section 53 such that a packet can be received correctly by the reception apparatus 131.

In step S21, the control section 51 controls the data processing section 52 to generate a new preamble and controls the transmission section 53 to transmit the new preamble to the reception apparatus 131 through the antenna 57. More particularly, the preamble generation section 73 of the data processing section 52 generates a new preamble and causes the new preamble to be transmitted from the transmission section 53 to the reception apparatus 131 through the antenna 57. The new preamble includes information for controlling the AGC of the LNA in the reception section 155 of the reception apparatus 131.

On the other hand, in the case where it is decided in step S15 that, although the response signal has the BSS to which the own apparatus belongs, it is not destined for the own apparatus, the processing advances to step S22.

In the case where, although the response signal has the BSS to which the own apparatus belongs, it is not destined for the own apparatus in step S22, the control section 51 considers that a collision is caused by the transmission packet transmitted from the own apparatus and stops the transmission operation.

Further, in the case where it is decided in step S14 that the response signal is not destined for the BSS to which the own apparatus belongs, the processing advances to step S23.

In step S23, the control section 51 controls the data processing section 52 to recognize a reception situation of the reception apparatus 131, which belongs to a BSS other than the BSS of the own apparatus and transmitted thereto, from the FP included in the response signal and decide whether or not the interfering amount is greater than a predetermined value and it is necessary to suppress the output power in order to suppress the interfering amount. More particularly, the interfering decision section 75 of the data processing section 52 recognizes a reception situation of the reception apparatus 131, which belongs to a BSS other than the BSS of the own apparatus and transmitted thereto, from the FP included in the response signal and decides whether or not suppression of the interfering amount being provided to the reception apparatus 131 belonging to a BSS other than the BSS is necessary.

More particularly, the interfering decision section 75 performs decision on the basis of whether or not the difference between the interference level provided to the reception apparatus 131 by the own apparatus (=[transmission power of transmission section]−[transmission power level information]+[reception level of response signal]) and an allowable interference level of the reception apparatus 131 (=[interference power level information]+[SINR information]−[target SINR information]) is greater than a predetermined threshold value. Further, the interfering decision section 75 may perform comparison with reception packet priority information and perform decision on the basis of whether or not the priority is higher than that of the packet being transmitted from the own apparatus.

In the case where it is decided in step S23 that it is necessary to suppress the interfering amount, the processing advances to step S19, in which the transmission power is adjusted similarly as in the case where it is tried to improve the reception environment.

On the other hand, in the case where it is decided in step S23 that it is not necessary to suppress the interfering amount, the processing advances to step S18.

By the processes described above, the transmission apparatus 31 decides, on the basis of a response signal transmitted thereto every time a sub-frame from the reception apparatus 131 is received, whether it is necessary to improve the reception environment or whether or not it is necessary to suppress the interfering amount in response to the reception situation. Then, in the case where the transmission apparatus 31 decides that it is necessary to improve the reception environment or to suppress the interfering amount, the transmission apparatus 31 transmits an interruption frame indicative of interruption of transmission of a sub-frame to the reception apparatus 131 such that the reception apparatus 131 recognizes that transmission of a sub-frame will be interrupted. Then, the transmission apparatus 31 interrupts the transmission of a sub-frame and changes the transmission parameter for improving the reception environment or suppressing the interfering amount, and then re-transmits the transmission parameter beginning with a new preamble.

As a result, in the case where the reception environment of the reception apparatus 131 degrades or in the case where the interfering amount increases, by appropriately improving the transmission output power of the transmission apparatus 31, it is possible to implement stabilized communication. Further, since it is possible to perform dynamic change, stabilized communication can be implemented also in regard to communication by a mobile apparatus.

Reception Process of Reception Apparatus in First Embodiment

Figure 9:
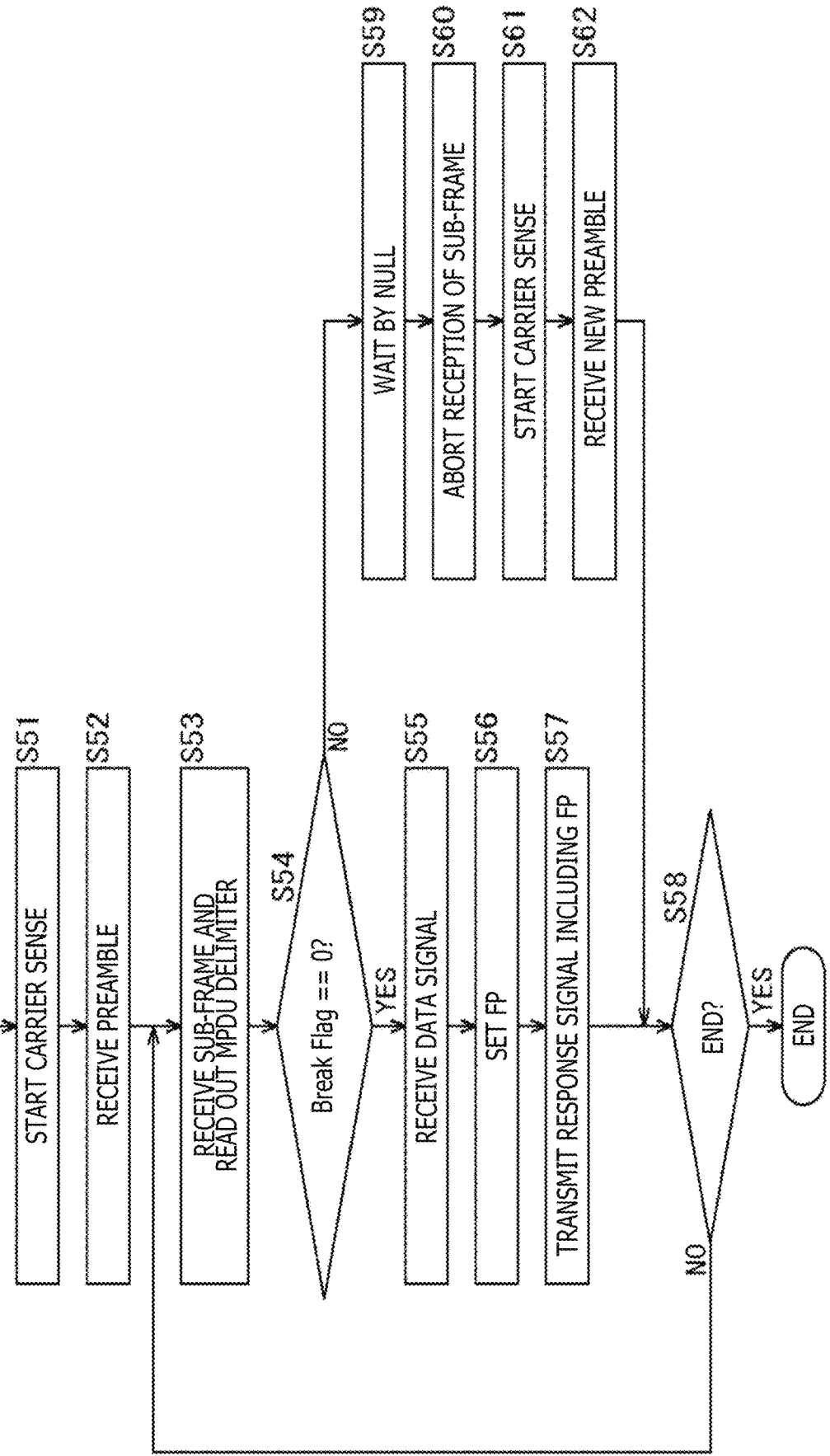
FIG. 9 is a flow chart illustrating a reception process by the reception apparatus of FIG. 4.

Now, a reception process of the reception apparatus in the first embodiment is described with reference to a flow chart of FIG. 9.

In step S51, the control section 151 controls the reception section 155 to start a carrier sense for searching for a preamble through the antenna 157.

In step S52, the control section 151 controls the reception section 155 to receive a preamble through the antenna 157. By this process, the control section 151 adjusts the AGC (Auto Gain Control) of the LNA (Low Noise Amplifier) included in the RF reception section 202 in the reception section 155 on the basis of information included in the preamble.

In step S53, the control section 151 controls the reception section 155 to receive a new sub-frame through the antenna 157 and further reads out an MPDU delimiter in the sub-frame.

In step S54, the control section 151 controls the data processing section 152 to decide whether or not the interruption flag in the MPDU delimiter is off (Break Flag==0). More particularly, the interruption decision section 171 of the data processing section 152 decides whether or not the interruption flag in the MPDU delimiter is off (Break Flag==0).

In the case where it is decided in step S54 that the interruption flag is off (Break Flag==0), namely, in the case where the sub-frame is an ordinary sub-frame, the processing advances to step S55.

In step S55, the control section 151 controls the reception section 155 to receive a data signal in the sub-frame.

In step S56, the control section 151 controls the data processing section 152 to set an FP. More particularly, the FP setting section 172 of the data processing section 152 sets an FP (field parameter) in response to a reception situation and supplies the FP to the response signal generation section 173.

In step S57, the control section 151 controls the data processing section 52 to generate a response signal including the FP and controls the transmission section 153 to transmit the response signal to the transmission apparatus 31. More particularly, the response signal generation section 173 of the data processing section 52 generates a response signal including the FP and causes the response signal to be transmitted to the transmission apparatus 31 through the transmission section 153.

It is decided in step S58 whether or not an instruction to end the processing is received. In the case where an instruction to end the processing is received, the processing is ended. However, in the case where it is not instructed to end the processing, the processing returns to step S53.

On the other hand, in the case where it is decided in step S54 that the interruption flag is on (Break Flag==1), namely, in the case where the sub-frame is an interruption frame, the processing advances to step S59.

In step S59, the control section 151 waits for the processing by a period of time corresponding to the NULL of the data signal part in the sub-frame in which the interruption flag is on (Break Flag==1), namely, in the interruption frame.

In step S60, the control section 151 controls the reception section 155 to abort the reception of the sub-frame.

In step S61, the control section 151 controls the reception section 155 to start a carrier sense for searching for a new preamble.

In step S62, the control section 151 controls the reception section 155 to receive the new preamble.

By the processes described above, it becomes possible for the reception apparatus 131 to transmit a reception situation of a sub-frame by the own apparatus as a response signal including the PF to the transmission apparatus 31. As a result, it becomes possible for the transmission apparatus 31 to decide the reception situation, and in the case where improvement of the reception situation is performed from the transmission apparatus 31, it becomes possible to recognize abortion of reception of a sub-frame and search for a new preamble on the basis of the interruption flag included in the sub-frame.

As a result, in the case where the reception environment of the reception apparatus 131 degrades, since it becomes possible for the transmission apparatus 31 to appropriately improve the transmission output, it becomes possible to implement stabilized communication. Further, since it is possible to perform dynamic change, also in communication by a mobile apparatus, it becomes possible to implement stabilized communication.

3. Second Embodiment

In the foregoing description, in order to allow the transmission apparatus 31 to decide, on the basis of a reception environment of the reception apparatus 131, whether or not a transmission parameter is to be adjusted to improve the reception environment, it is necessary to interrupt transmission of a sub-frame being currently transmitted and improve the reception environment and then re-transmit the sub-frame beginning with a new preamble. Therefore, it is necessary to transmit an interruption frame in order to notify the reception apparatus 131 that a new preamble will be transmitted.

However, in the case where the reception environment of the reception apparatus 131 is very bad, it is not always possible for the reception apparatus 131 to receive also an interruption frame correctly from the transmission apparatus 31, and it is supposed that the reception apparatus 131 cannot know at which timing a new preamble is transmitted thereto.

Therefore, for example, the reception apparatus 131 itself may decide whether or not it is necessary to improve the reception environment and ask the transmission apparatus 31 to adjust a transmission parameter.

Example of Sequence in Communication System of Second Embodiment

Now, an example of a sequence in a communication system of a second embodiment in which the reception apparatus 131 itself decides whether or not it is necessary to improve the reception environment and asks the transmission apparatus 31 to adjust the transmission parameter is described with reference to a timing chart of FIG. 10.

Figure 10:
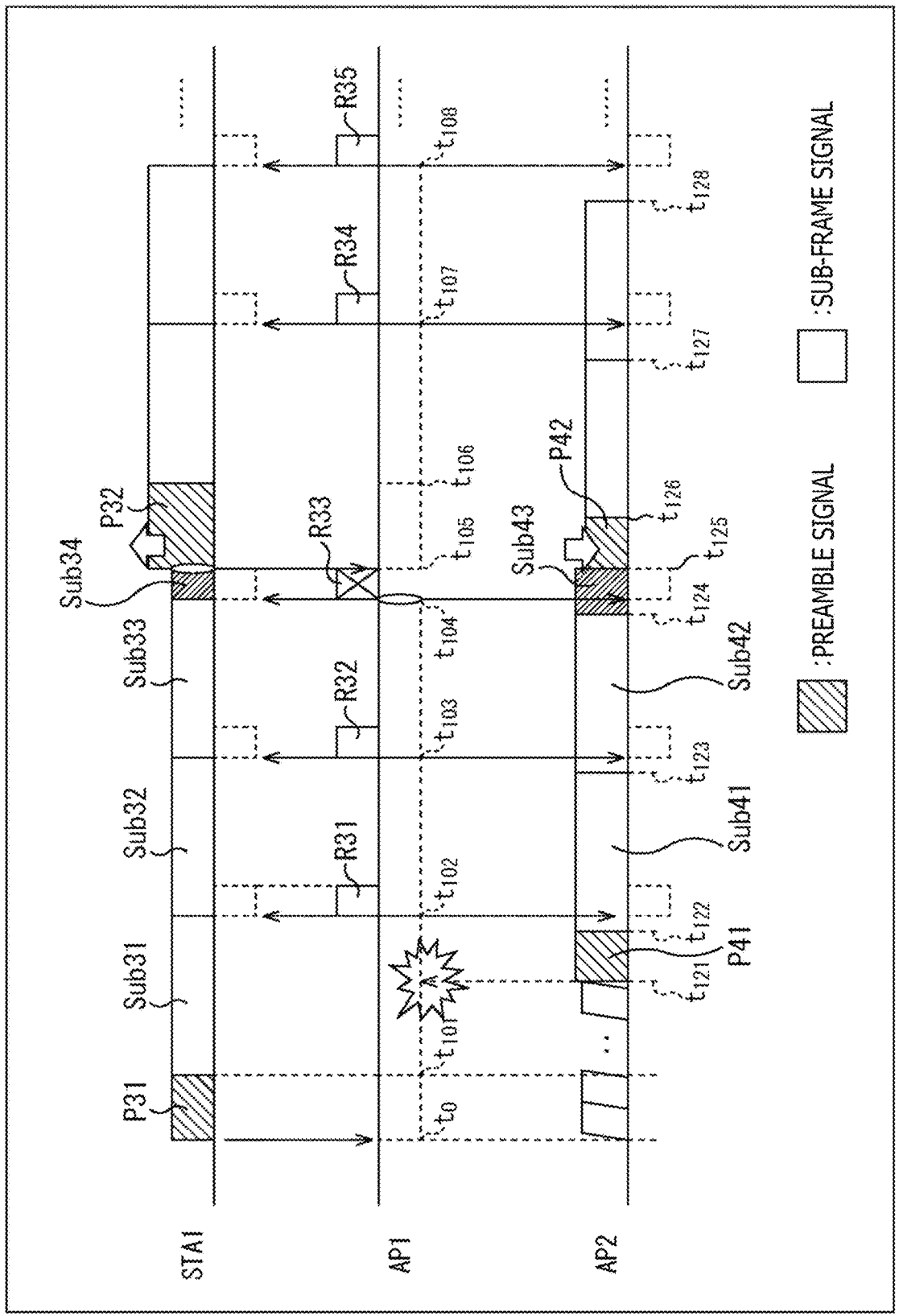
FIG. 10 is a view illustrating an example of a sequence of a communication system of a second embodiment.

In particular, in the case where the reception apparatus 131 itself decides whether or not it is necessary to improve the reception environment and asks the transmission apparatus 31 to adjust the transmission parameter, the sequence then becomes, for example, such a sequence as depicted in FIG. 10.

At time t0, the slave unit STA1 that functions as the transmission apparatus 31 transmits a preamble P31, and the access point AP1 that functions as the reception apparatus 131 receives the preamble P31.

Thereafter, at time t101, the slave unit STA1 that functions as the transmission apparatus 31 transmits a sub-frame Sub31 in which the interruption flag is off, and the access point AP1 that functions as the reception apparatus 131 receives the sub-frame Sub31. At this timing, since the interruption flag in the sub-frame Sub1 is off, the access point AP1 that functions as the reception apparatus 131 receives the sub-frame Sub31 as an ordinary sub-frame and recognizes that also a next sub-frame will be transmitted thereto as usual.

At time t102, the slave unit STA1 that functions as the transmission apparatus 31 transmits a sub-frame Sub32 in which the interruption flag is off, and the access point AP1 that functions as the reception apparatus 131 receives the sub-frame Sub32. Also at this timing, since the interruption flag is off, the access point AP1 that functions as the reception apparatus 131 receives the sub-frame Sub32 as an ordinary sub-frame and recognizes that also a next sub-frame will be transmitted thereto as usual.

Further, at this time, the access point AP1 that functions as the reception apparatus 131 decides on the basis of a reception situation of the immediately preceding sub-frame Sub31 whether or not it is necessary to improve the reception environment. In the case where it is not necessary, the access point AP1 transmits a response signal R31 on which the reception environment is reflected to the slave unit STA1 that functions as the transmission apparatus 31, and the slave unit STA1 receives the response signal R31. However, it is assumed that the response signal R31 does not include the information indicating that it is necessary to improve the reception environment.

At time t103, the slave unit STA1 that functions as the transmission apparatus 31 transmits a sub-frame Sub33 in which the interruption flag is off, and the access point AP1 that functions as the reception apparatus 131 receives the sub-frame Sub33. Also at this timing, since the interruption flag is off, the access point AP1 that functions as the reception apparatus 131 receives the sub-frame Sub33 as an ordinary sub-frame and recognizes that also a next sub-frame will be transmitted thereto as usual.

At this time, the access point AP1 that functions as the reception apparatus 131 decides on the basis of a reception situation of the immediately preceding sub-frame Sub32 whether or not it is necessary to improve the reception environment. In the case where this is not necessary, the access point AP1 transmits a response signal R32 on which the reception environment is reflected to the slave unit STA1 that functions as the transmission apparatus 31, and the slave unit STA1 receives the response signal R32. However, it is assumed that the response signal R32 does not include information indicating that it is necessary to improve the reception environment.

When the slave unit STA1 that functions as the transmission apparatus 31 transmits a sub-frame Sub34 in which the interruption flag is off at time t104, since the interruption flag is off, the access point AP1 that functions as the reception apparatus 131 receives the sub-frame Sub34 as an ordinary sub-frame and recognizes that also a next sub-frame is transmitted thereto as usual.

However, for example, at this time, in the case where it is necessary to improve the reception environment on the basis of the reception situation of the immediately preceding sub-frame Sub33, the access point AP1 that functions as the reception apparatus 131 transmits a response signal R33, which includes a signal that requests for improvement of the reception environment and indicates that reception of a sub-frame will be aborted, to the slave unit STA1 that functions as the transmission apparatus 31 and the access point AP2 such that the response signal R33 is received by the slave unit STA1 and the access point AP2. Meanwhile, the access point AP1 that functions as the reception apparatus 131 aborts reception of the sub-frame Sub34 after a predetermined period of time elapses after the response signal R33 is transmitted.

On the other hand, the slave unit STA1 and the access point AP2 improve the reception environment on the basis of the FP included in the response signal R33. Alternatively, the slave unit STA1 and the access point AP2 adjust the transmission parameter so as to suppress the interfering amount and output preambles P32 and P42 at time t105 (=t125), respectively.

By the sequence described above, it is possible for the reception apparatus 131 to decide whether or not it is necessary to improve the reception environment and, in the case where such improvement is necessary, issue, to the transmission apparatus 31, a request for improvement and a notification that reception of a sub-frame is aborted thereby to implement improvement of the reception environment.

As a result, even in such a situation that an interruption frame is disabled from being received correctly in the first embodiment, since a timing at which a new preamble is transmitted can be recognized at an own timing, even if the reception environment of the reception apparatus 131 is not good, it is possible to improve the reception environment and adjust the transmission parameter by the transmission apparatus 31 thereby to implement stabilized communication.

Example of Configuration of Second Embodiment of Transmission Apparatus

Now, an example of a configuration of the second embodiment of the transmission apparatus 31 is described with reference to FIG. 11. It is to be noted that, in the transmission apparatus 31 of FIG. 11, components having the same functions as those of the transmission apparatus 31 of FIG. 3 are denoted by the same reference signs, and description of them is suitably omitted.

Figure 11:
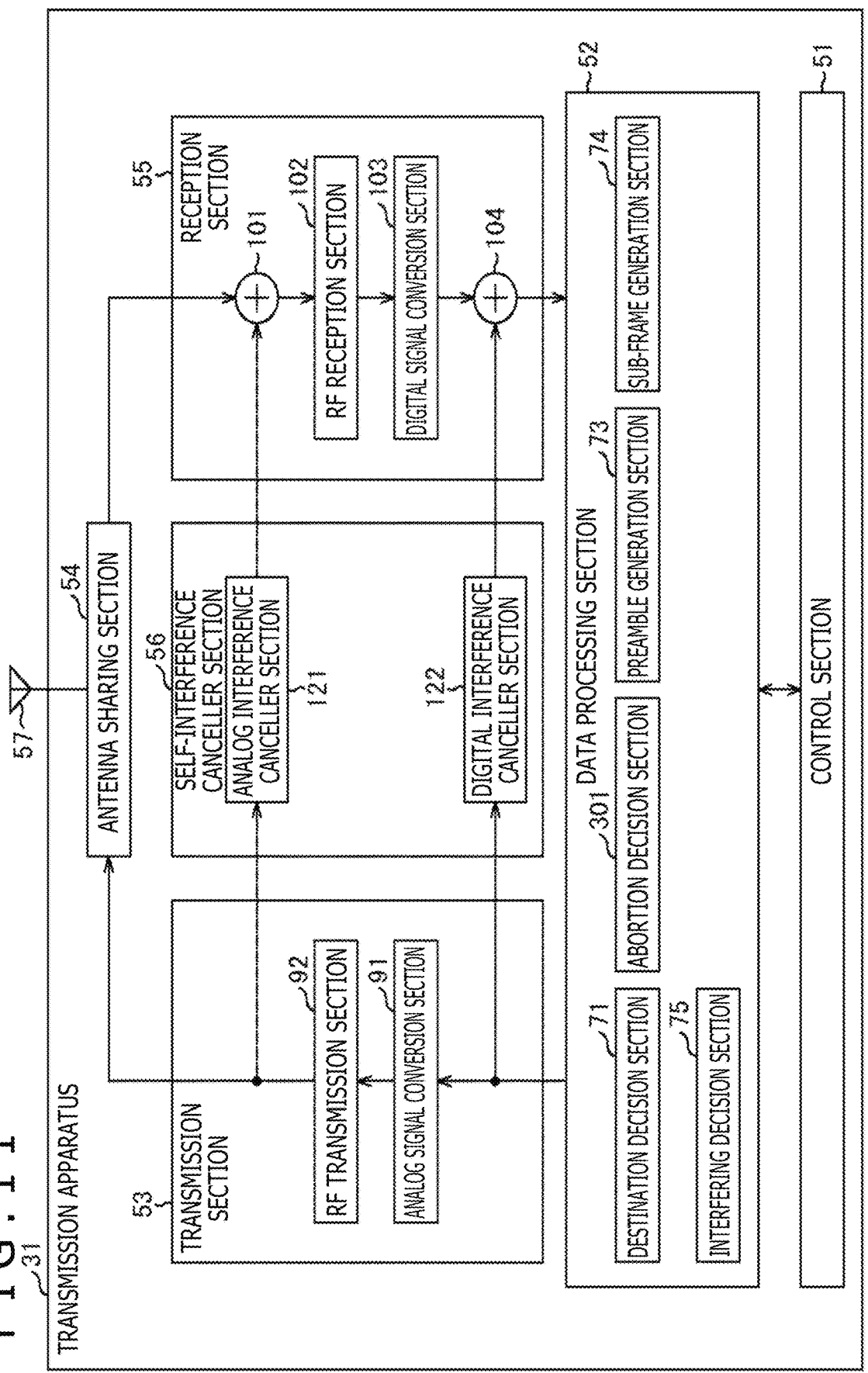
FIG. 11 is a view illustrating an overview of the first embodiment of the transmission apparatus of the communication system of the present disclosure.

In particular, the transmission apparatus 31 of FIG. 11 is different from the transmission apparatus 31 of FIG. 3 in that the data processing section 52 includes an abortion decision section 301 in place of the reception environment decision section 72.

The abortion decision section 301 decides whether or not the reception apparatus 131 is to abort reception of a sub-frame on the basis of whether or not a reception abortion flag provided newly in an FP included in a response signal supplied from the reception apparatus 131 is set to on or off.

It is to be noted that the reception abortion flag provided newly in an FP included in a response signal is hereinafter described in detail with reference to FIG. 13.

Example of Configuration of Second Embodiment of Reception Apparatus

Now, an example of a configuration of the second embodiment of the reception apparatus 131 is described with reference to FIG. 12. It is to be noted that, in the reception apparatus 131 of FIG. 12, components having functions same as those of the reception apparatus 131 of FIG. 4 are denoted by the same reference signs, and description of them is suitably omitted.

Figure 12:
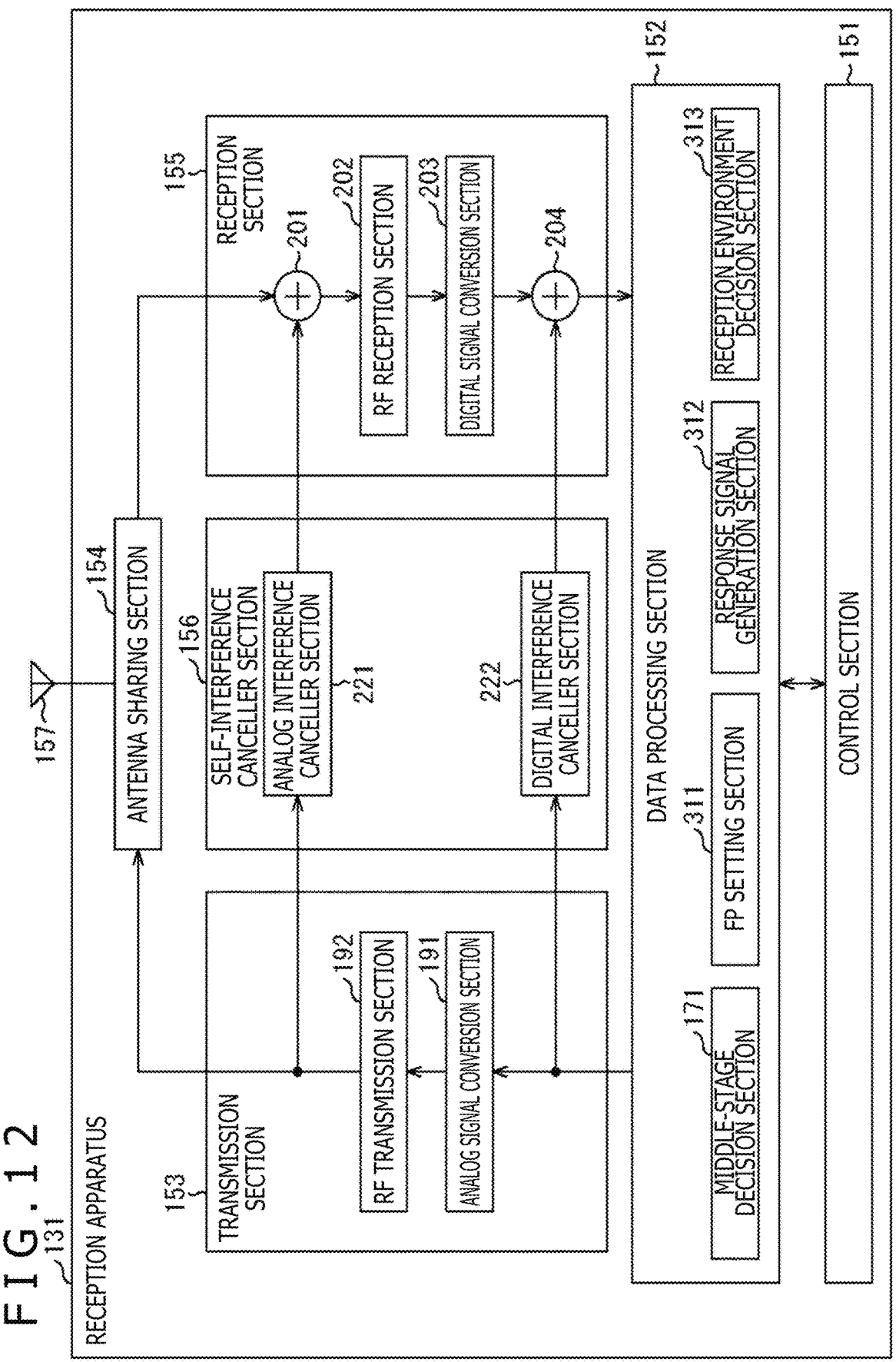
FIG. 12 is a view illustrating an overview of the first embodiment of the reception apparatus of the communication system of the present disclosure.

In particular, the reception apparatus 131 of FIG. 12 is different from the reception apparatus 131 of FIG. 4 in that an FP setting section 311 and a response signal generation section 312 are provided in place of the FP setting section 172 and the response signal generation section 173 and a reception environment decision section 313 is provided newly.

Although the FP setting section 311 and the response signal generation section 312 have basic functions similar to those of the FP setting section 172 and the response signal generation section 173, they are different in that, since a reception abortion flag is provided newly in the FP, the reception abortion flag is set and reflected on a response signal.

Although the reception environment decision section 313 has a basic function similar to that of the reception environment decision section 72 provided in the transmission apparatus 31 of FIG. 3, it decides on the basis of the FP determined by the reception apparatus 131 itself whether or not there is abortion of reception of a sub-frame.

Example of Configuration of Response Signal Frame in Second Embodiment

Now, an example of a configuration of a response signal frame in the second embodiment is described with reference to FIG. 13.

Figure 13:
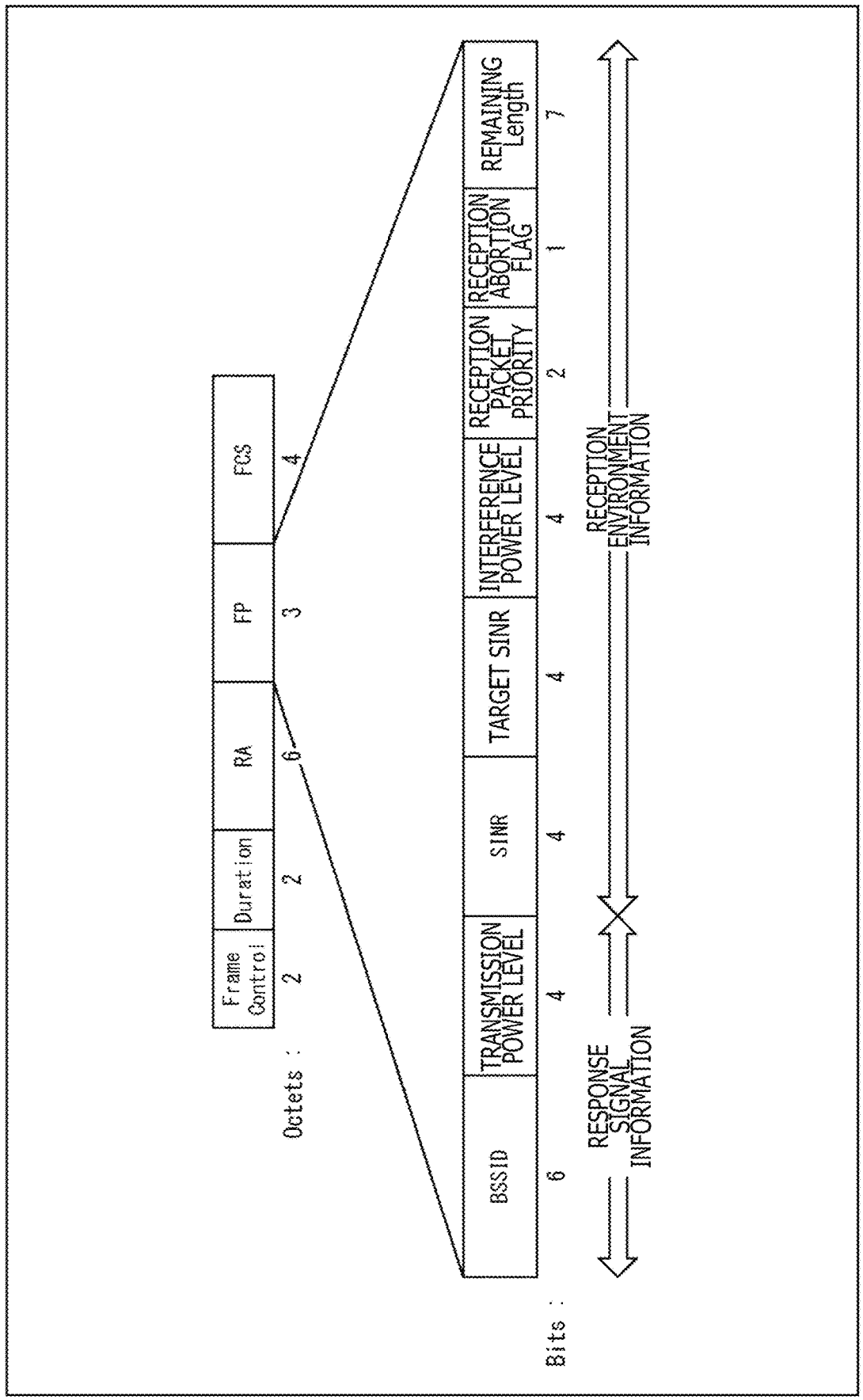
FIG. 13 is a view illustrating an example of a configuration of the first embodiment of a response signal frame.

It is to be noted that, although the response signal frame of FIG. 13 is basically similar to the response signal frame described hereinabove with reference to FIG. 6, it is different in that it further includes a reception abortion flag.

The reception abortion flag is provided as information of 1 bit as depicted at a right portion of a lower stage of FIG. 13, and in the case where reception abortion of a sub-frame is to be set, 1 is set, but in the case where reception abortion is not to be set, 0 is set.

In remaining Length of seven bits, a period of time after, when the reception abortion flag is set to 1 and reception of a sub-frame is to be aborted by the reception apparatus 131, reception of a sub-frame is aborted until a carrier sense of a preamble is newly started is recorded.

Transmission Process of Transmission Apparatus in Second Embodiment

Now, a transmission process of the transmission apparatus in the second embodiment is described with reference to a flow chart of FIG. 14. It is to be noted that processes at steps S111 to S115, S117, and S120 to S123 in the flow chart of FIG. 14 are similar to the processes at steps S11 to S15, S17, and S20 to S23 described hereinabove with reference to the flow chart of FIG. 8, and therefore, description of them is omitted.

In particular, in the case where a response signal is destined for the own apparatus in step S115, the processing advances to step S116.

In step S116, the control section 51 controls the data processing section 52 to decide whether or not the abortion flag is set to 1 to set abortion of reception of a sub-frame. More particularly, the abortion decision section 301 of the data processing section 52 decides whether or not the abortion flag in the FP of the received response signal is set to 1 to set abortion of reception of a sub-frame.

In the case where abortion of reception of a sub-frame is set in step S116, the processing advances to step S119.

In step S119, the control section 51 controls the transmission section 53 to stop transmission of the sub-frame being transmitted after lapse of a period of time corresponding to remaining Length, namely, of a period of time corresponding to remaining Length after the reception apparatus 131 aborts reception of a sub-frame.

In step S120, the control section 51 adjusts the transmission parameter on the basis of the FP and adjusts, for example, the transmission power and the modulation method such that the reception apparatus 131 can receive a packet correctly.

In step S121, the control section 51 controls the data processing section 52 to generate a new preamble and controls the transmission section 53 to transmit the new preamble to the reception apparatus 131 through the antenna 57. More particularly, the preamble generation section 73 of the data processing section 52 generates a new preamble and causes the new preamble to be transmitted from the transmission section 53 to the reception apparatus 131 through the antenna 57.

On the other hand, in the case where it is decided in step S123 that it is necessary to suppress the interfering amount, the processing advances to step S124.

In step S124, the control section 51 controls the data processing section 52 to generate a sub-frame of the interruption flag Break Flag==1 and controls the transmission section 53 to transmit the sub-frame to the reception apparatus 131 through the antenna 57. More particularly, the sub-frame generation section 74 of the data processing section 52 generates a sub-frame that indicates that transmission of the sub-frame of the interruption flag Break Flag==1 (interruption flag is on) is interrupted and controls the transmission section 53 to transmit the sub-frame as an interruption frame to the reception apparatus 131 through the antenna 57.

It is to be noted that, when a response signal destined for the transmission apparatus 31 of a different BSS is received, the reception abortion flag or remaining Length information may be used as a decision criterion for interfering amount suppression. For example, even if the difference between the interference level given to the reception apparatus 131 from the apparatus itself and the permissible interference level of the reception apparatus 131 is equal to or greater than a predetermined value and besides the priority of the packet being transmitted from the own apparatus is higher than the reception packet priority information, in the case where the reception abortion flag is "1" and the reception abortion timing indicated by the remaining Length information is time during transmission of a next sub-frame, the reception apparatus 131 may decide that adjustment of the transmission parameter is not to be performed.

Reception Process of Reception Apparatus in Second Embodiment

Figure 15:
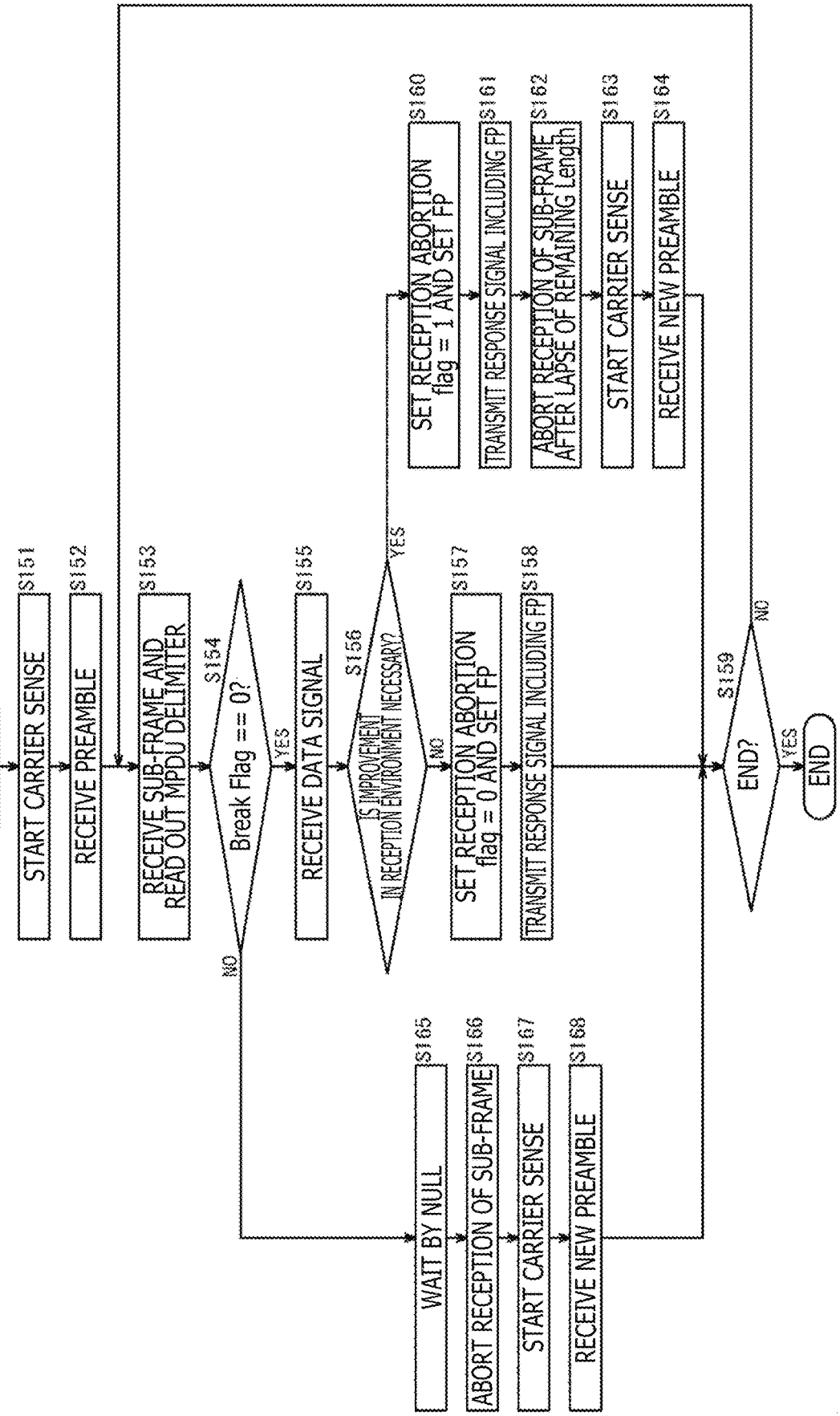
FIG. 15 is a flow chart illustrating a reception process by the reception apparatus of FIG. 12.

Now, a reception process of the reception apparatus in the second embodiment is described with reference to a flow chart of FIG. 15.

It is to be noted that, in the flow chart of FIG. 15, processes at steps S151 to S155 and steps S165 to S168 are similar to the processes at steps S51 to S55 and steps S59 to S62 described hereinabove with reference to the flow chart of FIG. 9, respectively, description of them is omitted.

In particular, if a data signal in a sub-frame is received in step S155, then the control section 151 controls the data processing section 152, in step S156, to decide on the basis of the FP of the own apparatus at present to decide whether or not it is necessary to improve the reception environment. More particularly, the reception environment decision section 313 of the data processing section 152 decides on the basis of the FP of the own apparatus whether or not it is necessary to improve the reception environment.

In the case where it is decided in step S156 that it is not necessary to improve the reception environment, the processing advances to step S157.

In step S157, the control section 151 controls the data processing section 152 to set the abortion flag in the FP to off (abortion flag=0). More particularly, the FP setting section 311 of the data processing section 152 sets the abortion flag in the FP to off.

In step S158, the control section 151 controls the data processing section 152 to transmit a response signal including the FP to the transmission apparatus 31. More particularly, the response signal generation section 312 of the data processing section 152 generates a response signal including the FP set by the FP setting section 311 and controls the transmission section 153 to transmit the response signal to the transmission apparatus 31.

On the other hand, in the case where it is decided in step S156 that it is necessary to improve the reception environment, the processing advances to step S160.

In step S160, the control section 151 controls the data processing section 152 to set the abortion flag in the FP to on (abortion flag=1). More particularly, the FP setting section 311 of the data processing section 152 sets the abortion flag in the FP to on.

In step S161, the control section 151 controls the data processing section 152 to transmit a response signal including the FP to the transmission apparatus 31. More particularly, the response signal generation section 312 of the data processing section 152 generates a response signal including the FP set by the FP setting section 311 and controls the transmission section 153 to transmit the response signal to the transmission apparatus 31.

In step S162, the control section 151 controls the reception section 155 to abort reception of a sub-frame after lapse of a period of time based on the remaining Length information.

In step S163, the control section 151 controls the reception section 155 to start a carrier sense for searching for a new preamble.

In step S164, the control section 151 controls the reception section 155 to receive a new preamble.

By the processes described above, the reception apparatus 131 decides whether or not it is necessary to improve the reception environment and issues, in the case where it is necessary to improve, a request for improvement and a notification that reception of a sub-frame is aborted to the transmission apparatus 31, by which it becomes possible to implement improvement of the reception environment.

As a result, even in such a situation that an interruption frame cannot be received correctly in the first embodiment, if the own apparatus decides and requests for improvement of a reception environment, then the timing at which a new preamble is transmitted can be recognized with the own timing. Therefore, even if the reception environment of the reception apparatus is bad, it is possible to implement stabilized communication with the transmission parameter adjusted while the reception environment is improved.

4. Example Executed by Software

Incidentally, while the series of processes described above can be executed by hardware, it can otherwise be executed also by software. In the case where the series of processes is executed by software, a program that constructs the software is installed into a computer incorporated in hardware for exclusive use, a computer, for example, for universal use that can execute various functions by installing various programs into the computer or the like from a recording medium.

Figure 16:
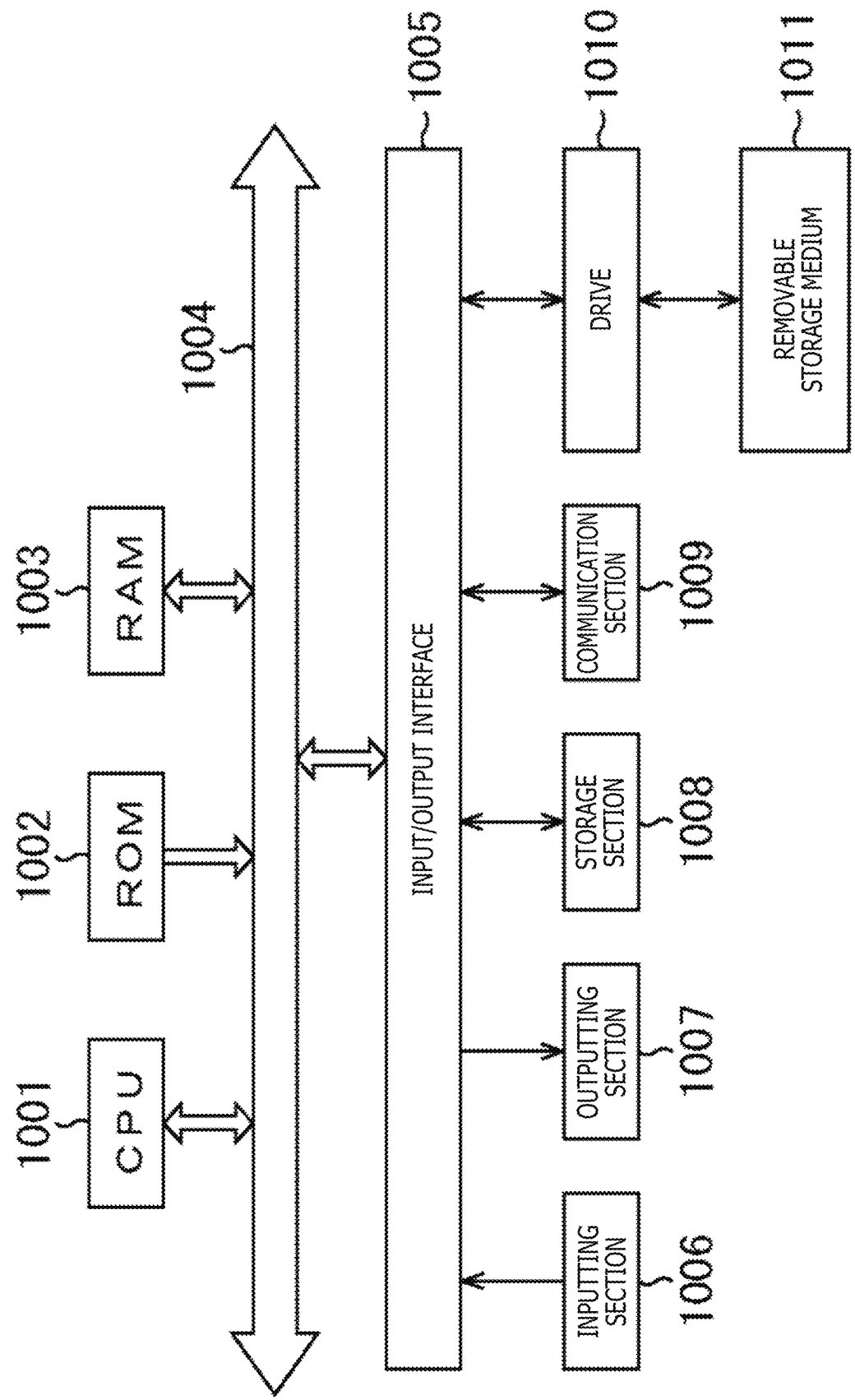
FIG. 16 is a view illustrating an example of a configuration of a personal computer for universal use.

FIG. 16 depicts an example of a configuration of a computer for universal use. This personal computer has a CPU (Central Processing Unit) 1001 built therein. To the CPU 1001, an input/output interface 1005 is connected through a bus 1004. To the bus 1004, a ROM (Read Only Memory) 1002 and a RAM (Random Access Memory) 1003 are connected.

To the input/output interface 1005, an inputting section 1006 including an inputting device such as a keyboard, a mouse, and so forth for allowing a user to input a manipulation command therethrough, an outputting section 1007 that outputs a process manipulation screen image or an image of a result of processing to a display device, a storage section 1008 including a hard disk drive or the like for storing programs and various data, and a communication section 1009 that includes a LAN (Local Area Network) adapter or the like and executes a communication process through a network represented by the Internet are connected. Further, a drive 1010 is connected which reads and writes data from and on a removable storage medium 1011 such as a magnetic disk (including a flexible disk), an optical disk (including a CD-ROM (Compact Disc-Read Only memory) and a DVD (Digital Versatile Disc)) and a magneto-optical disk (including an MD (Mini Disc)), a semiconductor memory or the like.

The CPU 1001 executes various processes in accordance with a program stored in the ROM 1002 or a program read out from a removable storage medium 1011 such as a magnetic disk, an optical disk, a magneto-optical disk or a semiconductor memory, installed into the storage section 1008 and loaded from the storage section 1008 to the RAM 1003. Into the RAM 1003, also data and so forth necessary for the CPU 1001 to execute various processes are stored suitably.

In the computer configured in such a manner as described above, the CPU 1001 performs the series of processes described above by loading a program, for example, stored in the storage section 1008 into the RAM 1003 through the input/output interface 1005 and the bus 1004 and executing the program.

The program to be executed by the computer (CPU 1001) can be recorded into and provided as the removable storage medium 1011, for example, as a package medium. Further, the program can be provided through a wired or wireless transmission medium such as a local area network, the Internet or a digital satellite broadcast.

In the computer, the program can be installed into the storage section 1008 through the input/output interface 1005 by mounting the removable storage medium 1011 on the drive 1010. Alternatively, the program can be received by the communication section 1009 through a wired or wireless transmission medium and installed into the storage section 1008. Further, the program can be installed in advance in the ROM 1002 or the storage section 1008.

It is to be noted that the program to be executed by the computer may be a program by which processes are performed in a time series in accordance with the order described in the present specification or may be a program by which processes are performed in parallel or each process is performed at a necessary timing such as when it is called.

It is to be noted that the CPU 1001 in FIG. 16 implements the functions of the control sections 51 and 151 depicted in FIGS. 3, 4, 11, and 12.

Further, in the present specification, the term "system" is used to signify an aggregation of a plurality of components (devices, modules (parts), and so forth) and it does not matter whether or not all components are accommodated in the same housing. Accordingly, a plurality of apparatuses accommodated in separate housings and connected to each other through a network is a system, and also one apparatus in which a plurality of modules is accommodated in a single housing is a system.

It is to be noted that the embodiment of the present disclosure is not limited to the embodiments described hereinabove and allows various alterations without departing from the subject matter of the present disclosure.

For example, the present disclosure can take a configuration for cloud computing by which one function is shared and cooperatively processed by a plurality of apparatuses through a network.

Further, each of the steps described hereinabove with reference to the flow charts may be executed by a single apparatus or may be shared and executed by a plurality of apparatuses.

Further, in the case where a plurality of processes is included in one step, the plurality of processes included in the one step may be executed by one apparatus or may be shared and executed by a plurality of apparatuses.

It is to be noted that the present disclosure can take also such configurations as described below.

<1> A transmission apparatus including:

a transmission section configured to transmit a data signal to a reception apparatus;

a reception section configured to receive a response signal from the reception apparatus by which the data signal is received simultaneously when the data signal is transmitted; and a control section configured to adjust a transmission parameter for controlling the transmission of the transmission section on the basis of the response signal, in which the transmission section is controlled with the transmission parameter adjusted by the control section to transmit the data signal to the reception apparatus.

<2> The transmission apparatus according to <1>, in which the control section decides on the basis of the response signal whether or not it is necessary to adjust the transmission parameter and adjusts the transmission parameter for controlling the transmission of the transmission section.

<3> The transmission apparatus according to <2>, in which the control section decides on the basis of reception information included in the response signal whether or not it is necessary to adjust the transmission parameter.

<4> The transmission apparatus according to <3>, in which in a case where the response signal is a response signal destined for the transmission apparatus, the control section adjusts the transmission parameter on the basis of the reception information included in the response signal so as to improve a reception situation of the reception apparatus.

<5> The transmission apparatus according to <3>, in which in a case where the response signal is a response signal destined for a transmission apparatus of another network, the control section adjusts the transmission parameter on the basis of the reception information included in the response signal so as to suppress an influence by interference with the reception apparatus.

<6> The transmission apparatus according to <2>, in which the control section decides, on the basis of a notification included in the response signal and indicative of whether or not there is an interruption of a reception operation by the reception apparatus, whether or not it is necessary to adjust the transmission parameter and adjusts the transmission parameter for controlling the transmission of the transmission section.

<7> The transmission apparatus according to any one of <1> to <6>, in which when the transmission section is controlled with the transmission parameter adjusted by the control section to transmit the data signal to the reception apparatus, the transmission section re-transmits the data signal beginning with a top of the data signal.

<8> The transmission apparatus according to <7>, in which in the case where the transmission section is controlled with the transmission parameter adjusted by the control section to transmit the data signal to the reception apparatus, the transmission section first interrupts transmission of the data signal being transmitted to the reception apparatus and then re-transmits the data signal beginning with the top of the data signal.

<9> The transmission apparatus according to <8>, in which in the case where the transmission section interrupts the transmission of the data signal being transmitted to the reception apparatus, the transmission section notifies the reception apparatus in advance that the transmission of the data signal being transmitted is to be interrupted.

<10> A transmission method including:

a transmission process of transmitting a data signal to a reception apparatus;

a reception process of receiving a response signal from the reception apparatus by which the data signal is received simultaneously when the data signal is transmitted; and a control process of adjusting a transmission parameter for controlling the transmission of the transmission process on the basis of the response signal, in which the transmission process is controlled with the transmission parameter adjusted by the control process to transmit the data signal to the reception apparatus.

<11> A Reception Apparatus Including:

a reception section configured to receive a data signal transmitted from a transmission apparatus; and a transmission section configured to transmit a response signal to the reception of the data signal by the reception section simultaneously when the data signal is received, in which the reception section receives the data signal whose transmission is controlled with a transmission parameter adjusted on the basis of the response signal by the transmission apparatus.

<12> The reception apparatus according to <11>, in which the transmission section places, into the response signal to the reception of the data signal by the reception section, reception information when the data signal is received by the reception section and transmits the resulting response signal simultaneously when the data signal is received, and the reception section receives, from the transmission apparatus, the data signal whose transmission is controlled with a transmission parameter adjusted on the basis of the reception information included in the response signal.

<13> The reception apparatus according to <12>, in which the transmission section transmits the response signal including information relating to any one of reception quality or interference power as the reception information.

<14> The reception apparatus according to any one of <11> to <13>, in which the reception section causes a reception operation of the data signal to be interrupted and causes a top portion of the data signal that is transmitted newly to be searched for.

<15> The reception apparatus according to <14>, in which the reception section causes the reception operation of the data signal to be interrupted and causes the top portion of the data signal that is transmitted newly to be searched for on the basis of a notification of interruption of a transmission operation of the data signal from the transmission apparatus.

<16> The reception apparatus according to <14>, in which the reception section causes the reception operation of the data signal to be interrupted and causes the top portion of the data signal that is transmitted newly to be searched for on the basis of a reception situation of the data signal.

<17> The reception apparatus according to <16>, in which the transmission section transmits a response signal that includes, as reception information, information indicative of whether or not there is an interruption of the reception operation of the data signal to the transmission apparatus.

<18> The reception apparatus according to any one of <11> to <17>, in which the transmission section transmits the response signal to the reception of the data signal by the reception section simultaneously when the data signal is received and transmits the response signal periodically.

<19> A Reception Method Including:

a reception process of receiving a data signal transmitted from a transmission apparatus; and a transmission process of transmitting a response signal to the reception of the data signal by the reception process simultaneously when the data signal is received, in which the reception process receives the data signal whose transmission is controlled with a transmission parameter adjusted on the basis of the response signal by the transmission apparatus.

<20> A Communication System Including:

a transmission apparatus; and a reception apparatus, in which the transmission apparatus includes a first transmission section configured to transmit a data signal to the reception apparatus, a first reception section configured to receive a response signal from the reception apparatus by which the data signal is received simultaneously when the data signal is transmitted, and a control section configured to adjust a transmission parameter for controlling the transmission of the first transmission section on the basis of the response signal, the first transmission section being controlled with the transmission parameter adjusted by the control section to transmit the data signal to the reception apparatus, and the reception apparatus includes a second reception section configured to receive a data signal transmitted from the transmission apparatus, and a second transmission section configured to transmit a response signal to the reception of the data signal by the second reception section simultaneously when the data signal is received, the second reception section receiving the data signal whose transmission is controlled with a transmission parameter adjusted on the basis of the response signal by the transmission apparatus.

REFERENCE SIGNS LIST

31 Transmission apparatus, 51 Control section, 52 Data processing section, 53 Transmission section, 54 Antenna sharing section, 55 Reception section, 56 Self-interference canceller section, 57 Antenna, 71 Destination decision section, 72 Reception environment decision section, 73 Preamble generation section, 74 Sub-frame generation section, 75 Interfering decision section, 131 Transmission apparatus, 151 Control section, 152 Data processing section, 153 Transmission section, 154 Antenna sharing section, 155 Reception section, 156 Self-interference canceller section, 157 Antenna, 171 Interruption decision section, 172 FP setting section, 173 Response signal generation section, 301 Abortion decision section, 311 FP decision section, 312 Response signal generation section, 313 Reception environment decision section

The invention claimed is:

1. A transmission apparatus comprising:

circuitry configured to implement a transmission section configured to transmit a data signal to a reception apparatus;

a reception section configured to receive a response signal from the reception apparatus by which the data signal is received simultaneously when the data signal is transmitted; and a control section configured to adjust a transmission parameter for controlling the transmission of the transmission section on a basis of the response signal, wherein the transmission section is controlled with the transmission parameter adjusted by the control section to transmit a break flag followed by the data signal to the reception apparatus, and the transmission parameter comprises a modulation method.

2. The transmission apparatus according to claim 1, wherein the control section decides on the basis of the response signal whether or not it is necessary to adjust the transmission parameter and adjusts the transmission parameter for controlling the transmission of the transmission section.

3. The transmission apparatus according to claim 2, wherein
the control section decides on a basis of reception information included in the response signal whether or not it is necessary to adjust the transmission parameter.

4. The transmission apparatus according to claim 3, wherein
in a case where the response signal is a response signal destined for the transmission apparatus, the control section adjusts the transmission parameter on the basis of the reception information included in the response signal so as to improve a reception situation of the reception apparatus.

5. The transmission apparatus according to claim 3, wherein
in a case where the response signal is a response signal destined for a transmission apparatus of another network, the control section adjusts the transmission parameter on the basis of the reception information included in the response signal so as to suppress an influence by interference with the reception apparatus.

6. The transmission apparatus according to claim 2, wherein
the control section decides, on a basis of a notification included in the response signal and indicative of whether or not there is an interruption of a reception operation by the reception apparatus, whether or not it is necessary to adjust the transmission parameter and adjusts the transmission parameter for controlling the transmission of the transmission section.

7. The transmission apparatus according to claim 1, wherein
when the transmission section is controlled with the transmission parameter adjusted by the control section to transmit the data signal to the reception apparatus, the transmission section re-transmits the data signal beginning with a top of the data signal.

8. The transmission apparatus according to claim 7, wherein
in the case where the transmission section is controlled with the transmission parameter adjusted by the control section to transmit the data signal to the reception apparatus, the transmission section first interrupts transmission of the data signal being transmitted to the reception apparatus and then re-transmits the data signal beginning with the top of the data signal.

9. The transmission apparatus according to claim 8, wherein
in the case where the transmission section interrupts the transmission of the data signal being transmitted to the reception apparatus, the transmission section notifies the reception apparatus in advance that the transmission of the data signal being transmitted is to be interrupted.

10. A transmission method comprising:
a transmission process of transmitting a data signal to a reception apparatus;
a reception process of receiving a response signal from the reception apparatus by which the data signal is received simultaneously when the data signal is transmitted; and
a control process of adjusting a transmission parameter for controlling the transmission of the transmission process on a basis of the response signal, wherein
the transmission process is controlled with the transmission parameter adjusted by the control process to transmit a break flag followed by the data signal to the reception apparatus, and
the transmission parameter comprises a modulation method.

11. A reception apparatus comprising:
circuitry configured to implement
a reception section configured to receive a data signal transmitted from a transmission apparatus; and
a transmission section configured to transmit a response signal to the reception of the data signal by the reception section simultaneously when the data signal is received, wherein
the reception section receives a break flag followed by the data signal whose transmission is controlled with a transmission parameter adjusted on a basis of the response signal by the transmission apparatus, and
the transmission parameter comprises a modulation method.

12. The reception apparatus according to claim 11, wherein
the transmission section places, into the response signal to the reception of the data signal by the reception section, reception information when the data signal is received by the reception section and transmits the resulting response signal simultaneously when the data signal is received, and
the reception section receives, from the transmission apparatus, the data signal whose transmission is controlled with a transmission parameter adjusted on a basis of the reception information included in the response signal.

13. The reception apparatus according to claim 12, wherein
the transmission section transmits the response signal including information relating to any one of reception quality or interference power as the reception information.

14. The reception apparatus according to claim 11, wherein
the reception section causes a reception operation of the data signal to be interrupted and causes a top portion of the data signal that is transmitted newly to be searched for.

15. The reception apparatus according to claim 14, wherein
the reception section causes the reception operation of the data signal to be interrupted and causes the top portion of the data signal that is transmitted newly to be searched for on a basis of a notification of interruption of a transmission operation of the data signal from the transmission apparatus.

16. The reception apparatus according to claim 14, wherein
the reception section causes the reception operation of the data signal to be interrupted and causes the top portion of the data signal that is transmitted newly to be searched for on a basis of a reception situation of the data signal.

17. The reception apparatus according to claim 16, wherein
the transmission section transmits a response signal that includes, as reception information, information indicative of whether or not there is an interruption of the reception operation of the data signal to the transmission apparatus.

18. The reception apparatus according to claim 11, wherein
the transmission section transmits the response signal to the reception of the data signal by the reception section simultaneously when the data signal is received and transmits the response signal periodically.

19. A reception method comprising:
a reception process of receiving a data signal transmitted from a transmission apparatus; and
a transmission process of transmitting a response signal to the reception of the data signal by the reception process simultaneously when the data signal is received, wherein
the reception process receives a break flag followed by the data signal whose transmission is controlled with a transmission parameter adjusted on a basis of the response signal by the transmission apparatus, and
the transmission parameter comprises a modulation method.

20. A communication system comprising:
a transmission apparatus; and
a reception apparatus, wherein
the transmission apparatus includes circuitry configured to implement
a first transmission section configured to transmit a data signal to the reception apparatus,
a first reception section configured to receive a response signal from the reception apparatus by which the data signal is received simultaneously when the data signal is transmitted, and
a control section configured to adjust a transmission parameter for controlling the transmission of the first transmission section on a basis of the response signal,
the first transmission section being controlled with the transmission parameter adjusted by the control section to transmit a break flag followed by the data signal to the reception apparatus, and
the reception apparatus includes circuitry configured to implement
a second reception section configured to receive the data signal transmitted from the transmission apparatus, and
a second transmission section configured to transmit the response signal to the reception of the data signal by the second reception section simultaneously when the data signal is received,
the second reception section receiving the break flag followed by the data signal whose transmission is controlled with the transmission parameter adjusted on the basis of the response signal by the transmission apparatus, wherein the transmission parameter comprises a modulation method.

* * * * *